(12) United States Patent
Nurminen et al.

(10) Patent No.: US 7,660,587 B2
(45) Date of Patent: Feb. 9, 2010

(54) COMMUNICATIONS FROM HYPERTEXT DOCUMENTS

(75) Inventors: Jukka K. Nurminen, Espoo (FI);
Balazs Bakos, Töröbálint (HU); Hunor Demeter, Budapest (HU); Zoltan Ivanfi, Gödöllo (HU); Petri Stenman, Helsinki (FI); Jörgen Othman, Espoo (FI); Jukka Nihtilä, Espoo (FI); Timo K. Miettinen, Tursula (FI)

(73) Assignee: Nokia Corporation, Espoo (FI)

( * ) Notice: Subject to any disclaimer, the term of this patent is extended or adjusted under 35 U.S.C. 154(b) by 667 days.

(21) Appl. No.: 11/258,131

(22) Filed: Oct. 26, 2005

(65) Prior Publication Data

US 2007/0093255 A1    Apr. 26, 2007

(51) Int. Cl.
*H04B 7/00* (2006.01)

(52) U.S. Cl. .................. 455/455; 455/518; 455/519; 455/456.1; 379/22.11

(58) Field of Classification Search .................. 455/455, 455/519, 518; 379/221.11
See application file for complete search history.

(56) References Cited

U.S. PATENT DOCUMENTS

| | | | |
|---|---|---|---|
| 4,972,457 A | 11/1990 | O'Sullivan | |
| 5,719,925 A * | 2/1998 | Peoples | 379/201.01 |
| 6,035,214 A | 3/2000 | Henderson | |
| 6,370,394 B1 * | 4/2002 | Anttila | 455/417 |
| 6,460,084 B1 | 10/2002 | Van Horne et al. | |
| 2003/0112948 A1 * | 6/2003 | Brown et al. | 379/207.04 |
| 2004/0122951 A1 * | 6/2004 | Beck et al. | 709/227 |
| 2004/0267887 A1 | 12/2004 | Berger et al. | |
| 2005/0204900 A1 | 9/2005 | Burton | |
| 2006/0142005 A1 * | 6/2006 | Takaluoma et al. | 455/435.1 |

FOREIGN PATENT DOCUMENTS

| | | |
|---|---|---|
| GB | 2378279 A | 2/2003 |
| JP | 10-164171 | 6/1998 |
| JP | 10-174164 | 6/1998 |
| KR | 20020094782 A | 12/2002 |
| WO | WO9912325 | 3/1999 |
| WO | WO01/31930 A2 | 5/2001 |
| WO | WO2005104481 | 11/2005 |

OTHER PUBLICATIONS

Eiji Utsunomiya et al., "TINA-like solutions for implementing computer telephony services", KDD R&D Laboratories, Inc., 1998, pp. 280-286.

(Continued)

*Primary Examiner*—Matthew D Anderson
*Assistant Examiner*—Adel Youssef
(74) *Attorney, Agent, or Firm*—Locke Lord Bissell & Liddell LLP

(57) ABSTRACT

Efficient and effective communications are initiated from the selection, at a first user device, of a link in a resource. Based on this selection, a communications request is transmitted to a server. In addition, identification information of a second user device (such as a telephone number or an Internet Protocol (IP) address) is transmitted to the server. As a result of this request and identification information, a communication response is received at the second user device. This communications response may be of various types, such as a voice call, a message, or a rich call.

39 Claims, 21 Drawing Sheets

OTHER PUBLICATIONS

Internet document: The Java Community Process (SM) Program, JSRs: Java Specification Requests, JSR 253: Mobile Telephony API (MTA), http://jcp.org/en/jsr/detail?id=253 (downloaded Oct. 26, 2005).

Internet document: TAPI (Telephony Application Program Interface), SearchExchange.com Definitions—powered by whatis.com, http://searchexchange.techtarget.com/sDefinition/0,,sid43_gci213092,00.html (downloaded Oct. 26, 2005).

Internet document: Complete tasks quickly with Smart Tags in Office XP, Microsoft Corporation, http://office.microsoft.com/en-us/assistance/HA010347451033.aspx (downloaded Oct. 26, 2005).

Gnokki Project, "Controlling a Symbian Phone (Nokia 6660) from Linux", www.gnokki.org (downloaded Oct. 26, 2005).

Internet document: Gnokki FAQ, GnokKi, Version 0.6.8, http://www.gnokii.org./faq.shtml (downloaded Oct. 26, 2005).

Internet document: Products—Click-to-Talk, Crystal Voice Communications, http://www.crystalvoice.com/VOIP_Click-to-talk.htm (downloaded Oct. 26, 2005).

Crystal Voice Communications, Inc., *Click-to-Talk... Enhancing the Web Experience*, Feb. 28, 2005 (downloaded from http://www.crystalvoice.com/VOIP_Click-to-talk.htm on Oct. 26, 2005).

PCT International Search Report, International Application No. PCT/IB2006/000034, Date of Completion of Search—Nov. 22, 2006.

Search Report and Written Opinion of Singapore Application No. 200718061-5—Dated: Feb. 20, 2009.

* cited by examiner

COMMUNICATIONS FROM HYPERTEXT DOCUMENTS

FIELD OF THE INVENTION

The present invention relates to communications. More particularly, the present invention relates to techniques that provide for the efficient initiation of communications from various user applications.

BACKGROUND OF THE INVENTION

The Internet is increasingly being used for data communications, but is lacking in the area of voice communications. Thus, despite considerable discussion regarding the convergence of voice and data, few strong examples of such convergence currently exist.

For instance, people are increasingly using web-based Internet communications to gather information related to business and commerce. Such information may involve shopping for products and services. These communications typically involve using a browser to view hypertext documents. However, for many people, gathering information in this manner is insufficient. This is because many people still prefer voice conversations to discuss details and find out more information.

In a shopping context, a customer may initiate a voice conversation by viewing a telephone number from a company's web page and entering it into his phone manually. Alternatively, the company's web site may include a form that allows the customer to create a contact request. Based on this contact request, the company can call the customer back at a later time.

These techniques are inconvenient from the perspective of both customers and companies. For instance, these techniques require the customer to input information. Also, the submission of a contact request yields uncertainty regarding when the company will call back.

For the company, such techniques can unfortunately fail to gather desired information from the customer. An example of such information includes the particular web page that triggered the customer to call the company. This information can be used by the company in various ways to assess the reason for the customer call and to facilitate a productive conversation.

New alternatives are emerging for customers to initiate voice communications. For instance, it is possible for a user to initiate a call from a phone's browser by clicking any phone number. However, a drawback of this technique is that it only works if the customer is using his phone for browsing (which is still a rather rare in comparison to using a personal computer (PC) for browsing). Also, it is possible for a customer to initiate a call in a PC's browser by making a voice over IP (VoIP) call. However, few people are eager to use their PC for voice communications, even if the popularity of VoIP is increasing.

Also, multiple call links can allow a customer to call the proper department of a complex call center without requiring the customer to enter several numbers on his/her phone. In addition, such links can alleviate the need to traverse a call center's extensive voice navigation menus. Thus, the customer may more efficiently reach the right person to deal with his/her concern.

However, the above alternatives do not support the dominant and, for many people, natural way of separately using a computer (e.g., a PC) to view web pages and converse using telephone (e.g., a mobile phone). Moreover, there is a need for techniques that allow a person to choose a call link, and create a voice call with an entity in such a way that the entity has information regarding the circumstances of the call.

SUMMARY OF THE INVENTION

The present invention provides techniques that advantageously allow for efficient and effective communications. For instance, the present invention provides a method and system that selects at a first user device, a link in a resource and transmits a communications request to a server that is based on the link. In addition, the method and system transmits identification information of a second user device (such as a telephone number or an Internet Protocol (IP) address) to the server. Further, the method and system receives a communication response at the second user device. This communication response is in accordance with the communication request and the identification information. This communications response may be of various types, such as a voice call, a message, or a rich call.

In further aspects, the method and system may also receive from the server a communication announcement message at the first user device.

In further aspects, an apparatus includes a storage medium and a processor disposed in communication with the storage medium. The processor is configured to receive a user selection of a link in a resource, transmit a communication request to a server, the communications request based on the link, transmit identification information of a second user device to the server, and receive a communication announcement message from the server according to the communication request and the identification information.

According to yet further aspects of the present invention, a device receives a communications request from a first user device that is based on a link in a resource selected at the first user device. In addition, the device receives, from the first user device, identification information of a second user device. The device sends the identification information and information regarding the communication request to a remote device. Also, the device receives a communication verification message from the remote device. In response to the communication verification message, the device sends a communication announcement message to the first user device according to the communication request and the identification information.

Moreover, the present invention provides a device that receives, from a server, information regarding a communication request originated by a first user device and identifying information of a second user device. The device displays the identifying information and the information regarding the communication request, and in response to an operator selection, sends a communication verification message to the server. Also, in response to the operator selection, the device places a communication to a second user device, the communication in accordance with the identifying information and the information regarding the communication request.

In addition to the above, the present invention further provides various methods, systems, devices, and computer program products. Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
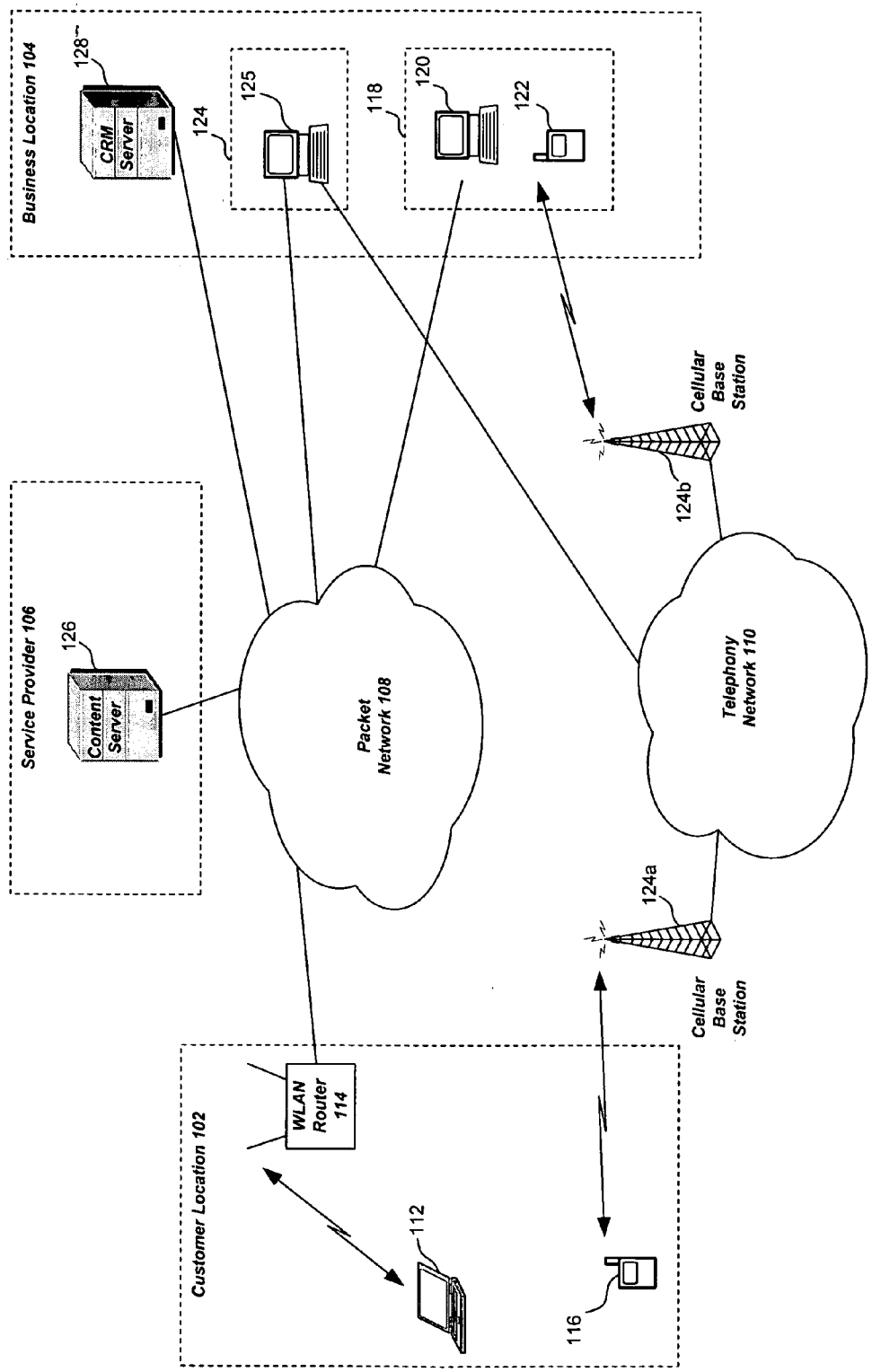
FIG. 1 is a diagram of an exemplary operational environment.

Before describing the invention in detail, it is first helpful to describe an environment in which the present invention may be employed. Thus, FIG. 1 is a diagram of an exemplary operational environment, according to an embodiment of the present invention. This environment includes a customer location 102, a business location 104, and a service provider 106. FIG. 1 shows business location 104 and service provider 106 being separate. However, in embodiments, they may be a same entity. Elements within these entities may communicate across a packet network 108 (such as the Internet) and/or across a telephony network 110.

For instance, customer location 102 includes a user device 112 that communicates across packet network 108 through a wireless local area network (WLAN) router 114. Examples of user device 112 include a personal desktop or a laptop computer, a personal digital assistant (PDA), a mobile computer, an on-board computer, a global positioning system (GPS) device, a television set, a set-top box (STB), a personal video recorder (PVR), a visual radio device, a video/audio device, etc. In addition, customer location 102 includes a user communications device 116 (such as a telephony device, a mobile communication device, etc.) that communicates across telephony network 110 via a cellular base station 124a. Although FIG. 1 shows user communications device 116 being a wireless device, it may alternatively be a conventional (i.e., wired) telephone directly coupled to telephony network 110.

As shown in FIG. 1, service provider 106 includes a content server 126. Content server 126 provides content (e.g., hypertext documents, files, e-mails, etc.) to client devices, such as user device 112. Moreover, according aspects of the present invention, content server 126 exchanges information with devices at customer location 102 and business location 104 to efficiently establish effective voice calls. Such communications may be made across packet network 108. As described above, this may include the Internet. However, digital broadcasting or multicasting networks may be employed. Examples of such networks include digital TV transmission (such as DVB, DVB-T, DVB-S, DVB-H), and/or digital radio transmission (such as DAB—digital audio broadcasting, DRM—digital radio mondiale, RDS—radio data system, or Visual Radio).

Business location 104 includes one or more communication processing stations, each associated with an operator (e.g., a realtor, a product sales representative, etc.). The communication processing stations operate to initiate communications, such as voice calls, according to the techniques of the present invention. As shown in FIG. 1, the communication processing stations may be implemented with a single device or with multiple devices. For instance, FIG. 1 shows call processing station 124, which is a computer terminal (or computer device) 125 such as a desktop computer, a laptop computer, a PDA, a mobile communications device, a wireless telephone, etc. In addition, FIG. 1 shows call processing station 118, which includes a computer terminal 120 and a communications device 122 (such as a telephony device, a mobile communications device, a wireless telephone, etc.) that may operate together or separately.

As shown in FIG. 1, computer terminal 125 is equipped to handle data communications across packet network 108 and voice communications across telephony network 110. Thus, computer terminal 125 includes software and hardware for the establishment and processing of voice calls and/or data communications. In addition, computer terminal 125 has an audio interface device such as a headset (not shown) for a person to engage in telephonic communications. Accordingly, computer terminal 125 may initiate voice calls according to the techniques of the present invention.

However, for call processing station 118, computer terminal 120 does not have voice call capabilities. Instead, it may direct communications device 122 to initiate particular calls.

According to aspects of the present invention, a user (e.g., a customer at location 102) may initiate a communications request, such as a voice call, by selecting a link from a resource provided by content server 126 or a message server (not shown) and displayed on user device 112. However, this voice call is not originated by user communications device 116. Instead, the voice call is placed by a device within business location 104 (e.g., by communications device 122 or computer terminal 125). Accordingly, information for placing the voice call is provided to business location 104 by content server 126. This information includes contact information of user communications device 116 (such as a telephone number of user communications device 116) as well as further information (i.e., metadata information) involving the circumstances and/or context in which the user initiated the communications request.

Alternatively or additionally, this information for placing the communication may be provided by content server 126 and/or customer relationship management (CRM) server 128. For instance, CRM server 128 may provide information regarding the user's name and/or address. In addition, CRM server 128 may also provide user account and/or status information. Such information facilitates an effective telephone conversation.

In alternative embodiments, user device 112 is connected to service provider 106 and business location 104 via a wireless telecommunication access point, such as base station 124a, and a wireless telecommunication network 110. Further, computer terminals 120 and 125 and communications device 122 are connected to user communications device 116 via packet network 108 and access point (or WLAN router) 114. Additionally, user device 112 and user communication device 116 may be connected to each other via wireless communications means (such as a short-range (e.g., Bluetooth, WLAN, or optical wireless communications link). Similarly, computer terminal 120 and communications device 122 may also be connected to each other via such wireless communications means.

II. Scenarios

Figure 2:
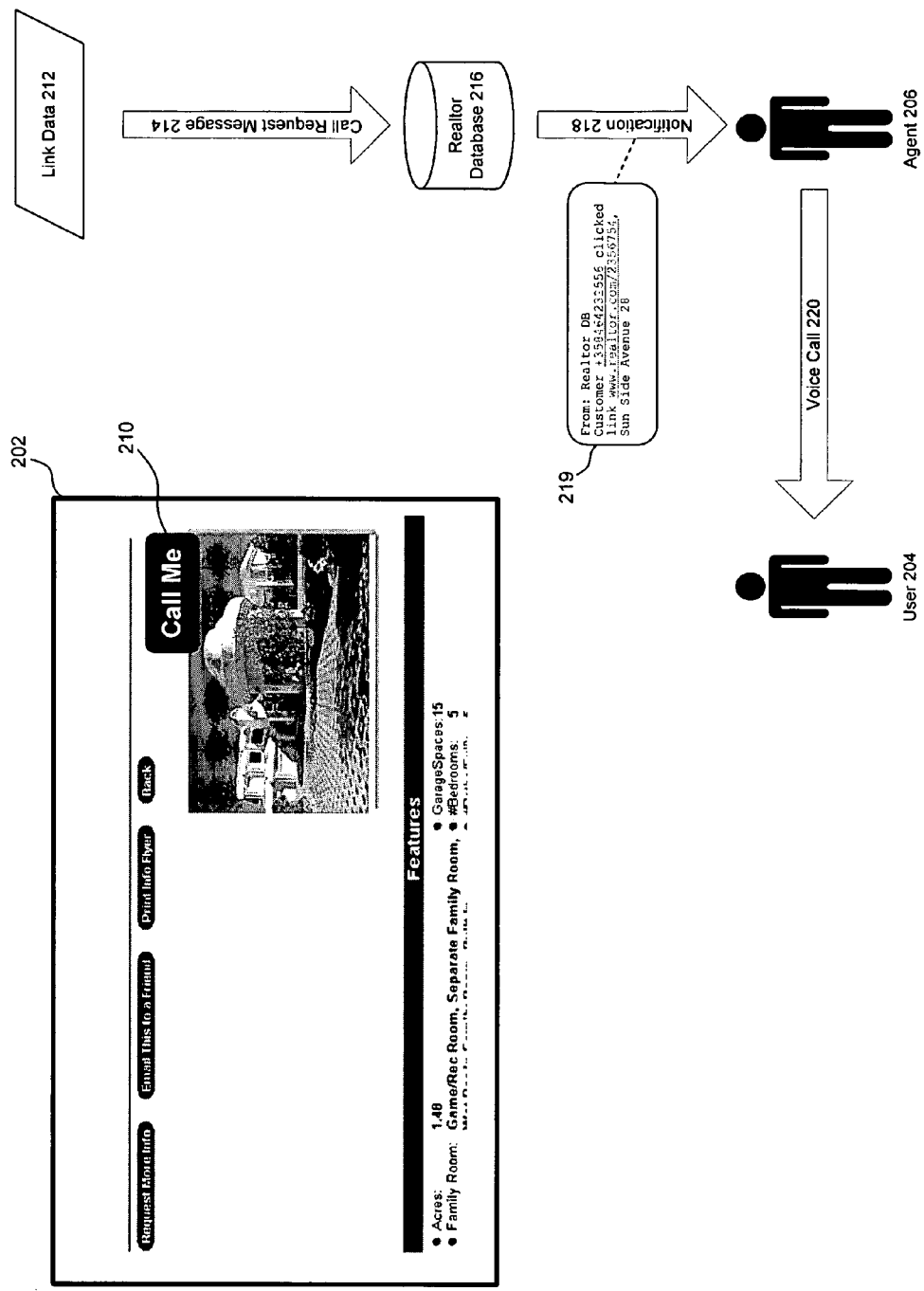
FIGS. 2 and 3 are diagrams of scenarios, according to aspects of the present invention.

FIG. 2 is a diagram of a scenario, according to an embodiment of the present invention. This scenario involves a resource 202, a user 204, and an agent 206.

Resource 202 is provided for a real estate agency and displays information regarding a home that is currently on the market. Resource 202 is delivered to the device of user 204 by a server (not shown). In embodiments of the present invention, this server may be content server 126. Resource 202 may be publicly available. Alternatively, resource 202 may be a personal resource that requires, for example, a password for user 204 to gain access.

Resource 202 may be in various formats. For example, resource 202 may be a hypertext document, such as a web page. Alternatively, resource 202 may be a word processing file (e.g., a DOC-file), an e-mail, an SMS message, a presentation, an image, etc. Thus, resource 202 may be stored and received in device 112, itself. Also, resource 202 may displayed to user 204 on various devices, such as a personal computer, laptop computer, personal digital assistant (PDA), wireless communications device, etc.

As shown in FIG. 2, resource 200 includes a communications request link, such as a call request link 210. This link is displayed as a button having the text "Call Me". Although not displayed, the server stores information associated with call request link 210. This information is shown in FIG. 2 as link data 212. Link data 212 includes information regarding the circumstances of the selection of link 210. For example, link data 212 may include contact information, such as the telephone number of user 204, the precise page that was opened, the particular link that was selected, the identity of the open document being displayed, context information of the user or the user device, the particular user device, and/or a device type that was used.

When user 204 selects this link (e.g., by clicking it), a call request message 214 is created and sent to the real estate agency. This message includes information, such as link data 212. Based on this information, the real estate agency can determine the reason for the selection of link 210 and can dispatch the appropriate sales agent.

This determination may involving the access of information stored and managed by the real estate agency. For instance, a computer system (not shown) can fetch the related sales material and/or customer information (if already in a customer relationship management (CRM) system) on the agent's screen. As an example, FIG. 2 shows information being accessed from a realtor database 216. This accessed information corresponds to the information contained in call request message 214. For example, the accessed information may include the identity of the sales agent handling the property associated with resource 202.

From this accessed information, a notification 218 is generated and sent to the appropriate sales agent (agent 206). Notification 218 may be in various forms. For example, notification 218 may be an SMS message (e.g., a flash SMS message) or an e-mail. Alternatively, it may be a displayed notification provided by a computer application that is employed by the real estate agency. Accordingly, this scenarios may involve the sales agent using various devices, such as a mobile communication device, a desk-top computer, a lap-top computer, or any combination of such devices.

FIG. 2 shows exemplary contents 219 of notification 218. These contents identify realtor database 216 as the originator of notification 219. In addition, these contents identify the telephone number of user 204, the identity of link 210, and the address of the associated home for sale. Thus, agent 206 immediately knows the matter that triggered call request message 214 and the house that triggered the user 204 initiate this request. This feature advantageously provides effective and efficient customer service.

Therefore, in response to notification 218, agent 206 places a voice call 220 to user 204. During this call, details regarding the property of resource 202 are discussed. Voice call 220 may be placed in various ways. For instance, agent 206 may employ automated techniques, such as selecting the telephone number in notification (e.g. by clicking an SMS message). This results in an almost immediate response if agent 206 is free.

Alternatively, if the agent is currently busy, a delayed call may be arranged. For instance, an automated notification message (text or voice) may be generated, for example, inquiring whether a later call is acceptable to user 204. User 204 may respond such messages with voice or data entry. The following is an example of such a message:

"Our sales agent responsible for this is busy and would like to call you in 5 minutes. Please let us know if that is ok. Yes/No"

In addition to the above advantages, this scenario provides several other benefits. For instance, this scenario does not require user 204 to navigate through several voice menus, as are commonplace with many organizations. Also, if resource 202 is a personal resource (personal page), call request message 214 may include identification information associated with user 204 (e.g., his/her telephone number). In embodiments, the techniques of the present invention employ authentication to ensure security for such personal resources.

Figure 3:
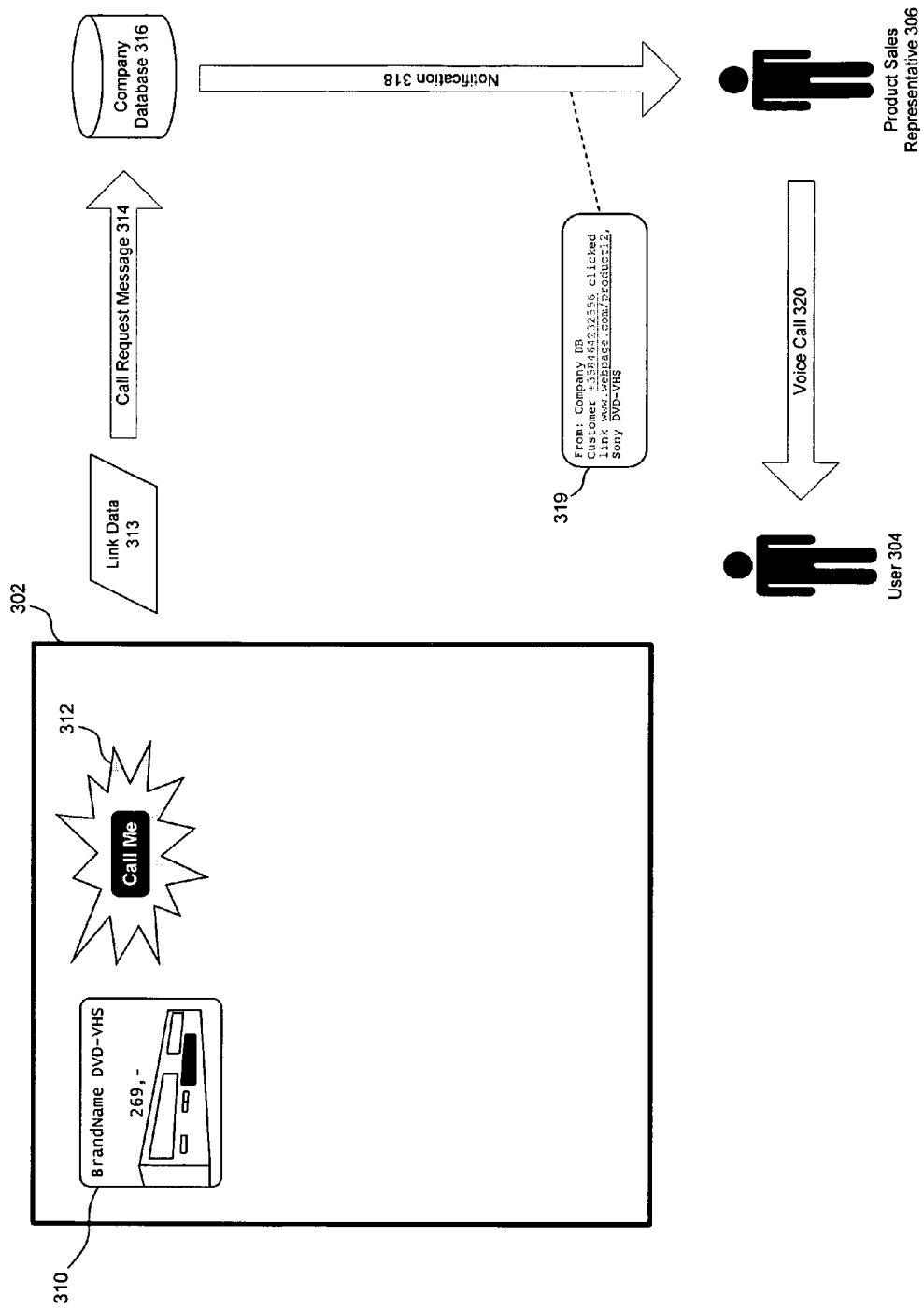

FIG. 3 is a diagram of a further scenario, according to embodiments of the present invention. This scenario involves a resource 302, a user 304, and a product sales representative 306.

Resource 302 is delivered to the device of user 304 by a server (not shown). In embodiments of the present invention, this server may be content server 126. Resource 302 may be publicly available. Alternatively, resource 302 may be a personal resource that requires, for example, a password for user 304 to gain access. Like resource 202, resource 302 may be in various formats. Examples of such formats include a hypertext document, a word processing file (e.g., a DOC-file), an e-mail, an SMS message, etc. Thus, resource 302 may displayed to user 304 on various devices.

As shown in FIG. 3, resource 302 displays an advertisement 310 regarding a product for sale. In particular, advertisement 310 involves a DVD-VHS player. A call request link 312 is associated with advertisement 310. Although not displayed, the server stores information associated with this link. This information is shown in FIG. 3 as link data 313.

Link data 313 includes information regarding the circumstances of the user's selection of link 312. For example, link data 313 may include the identity of the product offered by advertisement 310, the telephone number of user 304, the precise page that was opened, the particular link that was selected, and/or the identity of the open document being displayed.

When user 304 selects link 312 (e.g., by clicking it), a call request message 314 is created and sent to the company that sells the associated product. This message includes information, such as link data 313. Based on this information, the company can determine the reason for the selection of link 312 and can dispatch an appropriate product sales representative.

This determination may involving accessing information stored and managed by the company. For instance, a computer system (not shown) can fetch the related sales material and/or customer information (if already in a customer relationship management (CRM) system) on to the agents screen. As an example, FIG. 2 shows information being accessed from a company any database 316. This accessed information corresponds to the information contained in call request message 314. For example, the accessed information may include the identity of the product sales representative who handles the product associated with advertisement 310.

From this accessed information, a notification 318 is generated and sent to the appropriate sales representative (representative 306). Notification 318 may be in various forms, such as the forms described above with reference to the notification of FIG. 2.

FIG. 3 shows exemplary contents 319 of notification 318. These contents identify company database 316 as the originator of notification 319. In addition, these contents identify the telephone number of user 304, the identity of link 312, and model number of the associated product for sale (which can be derived from the identity of the link). Thus, product sales representative 306 immediately knows the matter that triggered call request message 314 and the product that triggered user 304 initiate this request. This feature advantageously provides effective and efficient customer service.

Therefore, in response to notification 318, representative 306 places a voice call 320 to user 304. During this call, details regarding the product are discussed. Voice call 320 may be placed in various automated and manual ways, as described above with reference to the call of FIG. 2. Also, a delayed call may be arranged and a notification may be sent, as described with reference to FIG. 2.

The scenario of FIG. 3 offers advantages over conventional approaches which require the user to place a call after viewing the advertisement. For instance, through the information contained in call request message 314, the company can track the resources (e.g., web pages) that generate interest in its product. Therefore, the techniques of the present invention allow the company to determine the success of their advertisements. In addition, the company can pay royalties based on the number of calls that are initiated from link selections at certain resources.

In FIGS. 2 and 3 user devices may receive resources across various networks, such as the Internet. Other networks include (but are not limited to) digital broadcasting or multicasting systems, such as digital TV transmission (such as DVB, DVB-T, DVB-S, DVB-H), and/or digital radio transmission (such as DAB—digital audio broadcasting, DRM—digital radio mondiale, RDS—radio data system, or Visual Radio).

III. Operation

FIGS. 4A through 4F are diagrams of operational sequences according to aspects of the present invention. These sequences are shown with reference to the environment of FIG. 1. For instance, these diagrams show user device 112, user communications device 116, and computer device 125. However, where not depicted, other devices (such as devices 120 and/or 122) may be employ these sequences. In addition, these diagrams (with the exception of FIG. 4C) show an information provider 400. In embodiments, information provider 400 may include content server 126 and/or CRM server 128, as well as other devices.

FIGS. 4A-4F are shown for purposes of illustration and not limitation. Thus, these sequences may be performed in other environments. Additionally, in embodiments of the present invention, the sequences between the diagrams may be combined, modified, and deleted in various ways.

Figure 4A:
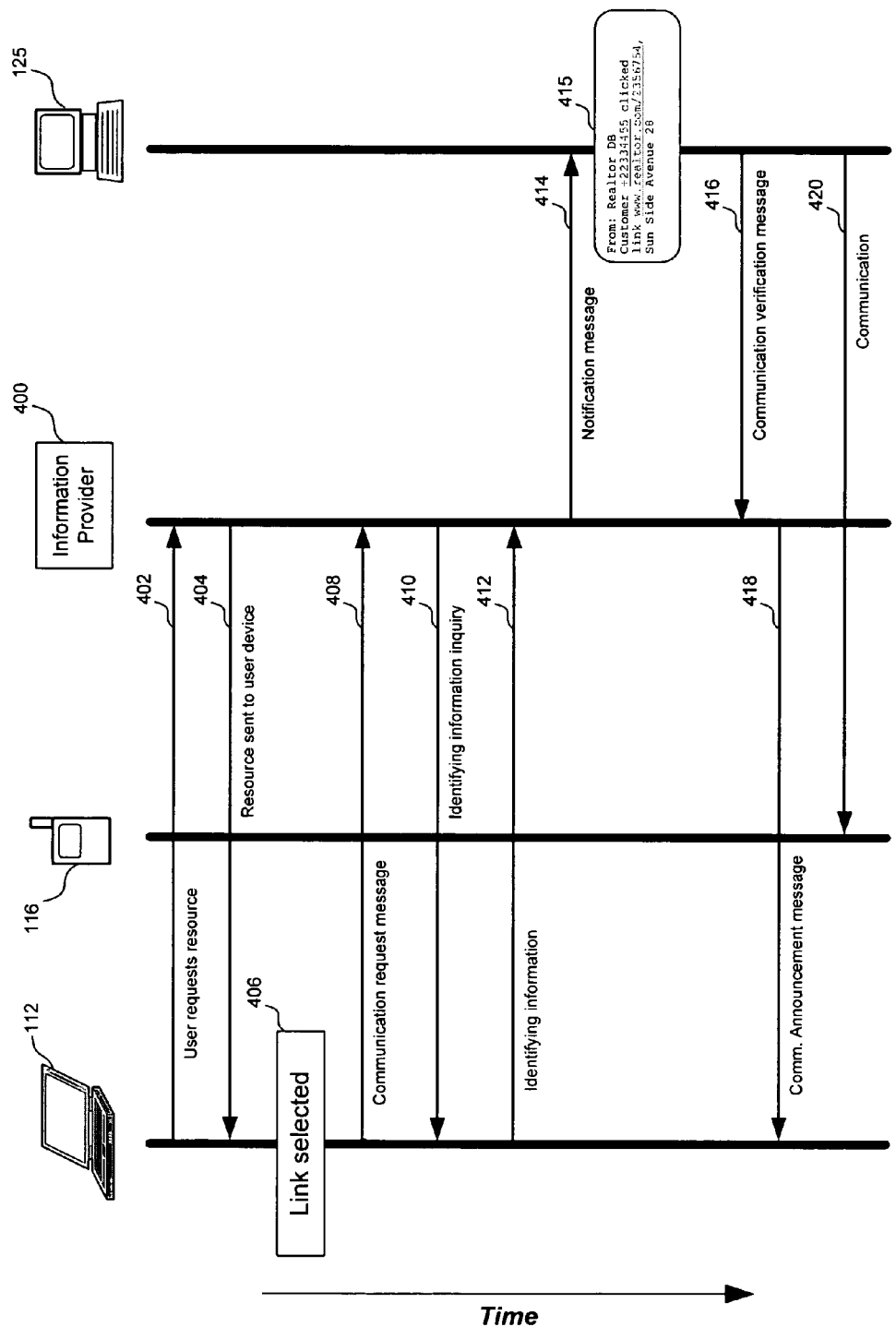
FIGS. 4A-4F are diagrams of sequences, according to aspects of the present invention.

FIG. 4A shows a sequence according to an embodiment of the present invention. This sequence includes a step 402. In this step, the user requests a resource from information provider 400. As an example, this request may be an HTTP GET request message. In a step 404, the requested resource is sent to user device 112 and displayed. This resource includes a communication request link, such as a call request link.

As described above with reference to FIGS. 2 and 3, the resource may be in various formats, such as a hypertext document (e.g., a web page), a word processing file (e.g., a DOC-file), an e-mail, an SMS message, etc.

In a step 406, the user selects the communication request link from within the displayed resource. Based on this selection, a communication (e.g., call) request message is generated in step 408. As shown in FIG. 4A, this request is sent to information provider 400. The communication request message may include various information. For example, this message may include a resource identifier (e.g., URL) of the corresponding service provider, a link ID, a link type, a document ID, a document ID, a document type, a service identifier (e.g., a real estate or product offering associated with the link), or any combination of these. In addition, this message may include information regarding the user. Such information may be stored by information provider 400 or provided by the user.

Following step 408, information provider 400 commences actions to obtain identifying information (e.g., a telephone number) for the user device. For instance, in a step 410, information provider 400 initiates a phone number inquiry message and sends it to user device 112.

In response to this inquiry message, a step 412 is performed in which identifying information is provided. For example, FIG. 4A shows user device 112 sending to information provider 400 a telephone number that is associated with the user (e.g., the number of user communications device 116). In this step, the user may manually input a telephone number. Alternatively, this step may involve automated processing that requires little or no user interaction.

In a step 414, information provider 400 sends a notification message to the realtor (shown as device 125). In embodiments, this message is an Immediate Display SMS that will "pop-up" without any user action. This advantageously makes communication formation very easy. As shown in FIG. 4, this notification includes information involving the circumstances of the communication request message. For instance, this request includes the telephone number provided in step 412. Also, this request includes an identifier of the call request link, as well as any additional information (i.e., link data) corresponding to the link. In embodiments, this link data is stored by information provider 400. For instance, the link data may include resource identifier (e.g., URL) of the corresponding service provider, a link ID, a link type, a document ID, a document ID, a document type, a service identifier, or any combination of these. In addition, the link data may include information regarding the user. Such information may be stored by information provider 400 or provided by the user.

As shown in FIG. 4A, the content of the notification message are displayed to the realtor in a step 415.

FIG. 4A shows that the realtor generates a communication verification message in a step 416. This verification message is sent to information provider 400. Upon receipt of the communication verification message, information provider 400 sends a corresponding communication announcement message to the user device 112 in a step 418. This message provides an indication to the user that the realtor is placing a communication (e.g., a voice call) to him. Alternatively, steps 416 and 418 need to be performed.

Accordingly, in a step 420, the realtor places a communication to user communications device 116, such as a voice call. With reference to FIGS. 1A and 1B, this communication may be placed across a telephony network (such as network 110). However, this communication may also be placed across various packet-based networks (such as network 108), or a combination of telephony and packet networks. In one embodiment, the call announcement message and voice call occur at substantially the same time.

According to another embodiment, step 408, information provider 400 includes commencing actions to obtain identifying information for the user. For instance, in step 410, information provider 400 initiates a identifying information inquiry message and sends it to user device 112. In response, user device 112 sends back identification information of user device 112 and/or user device 116, and/or the user itself. With this identification information, information provider 400 searches from one or more customer databases for the identification information of user device 116 and/or the user. This identification information may be a unique ID or some other code.

Figure 4B:
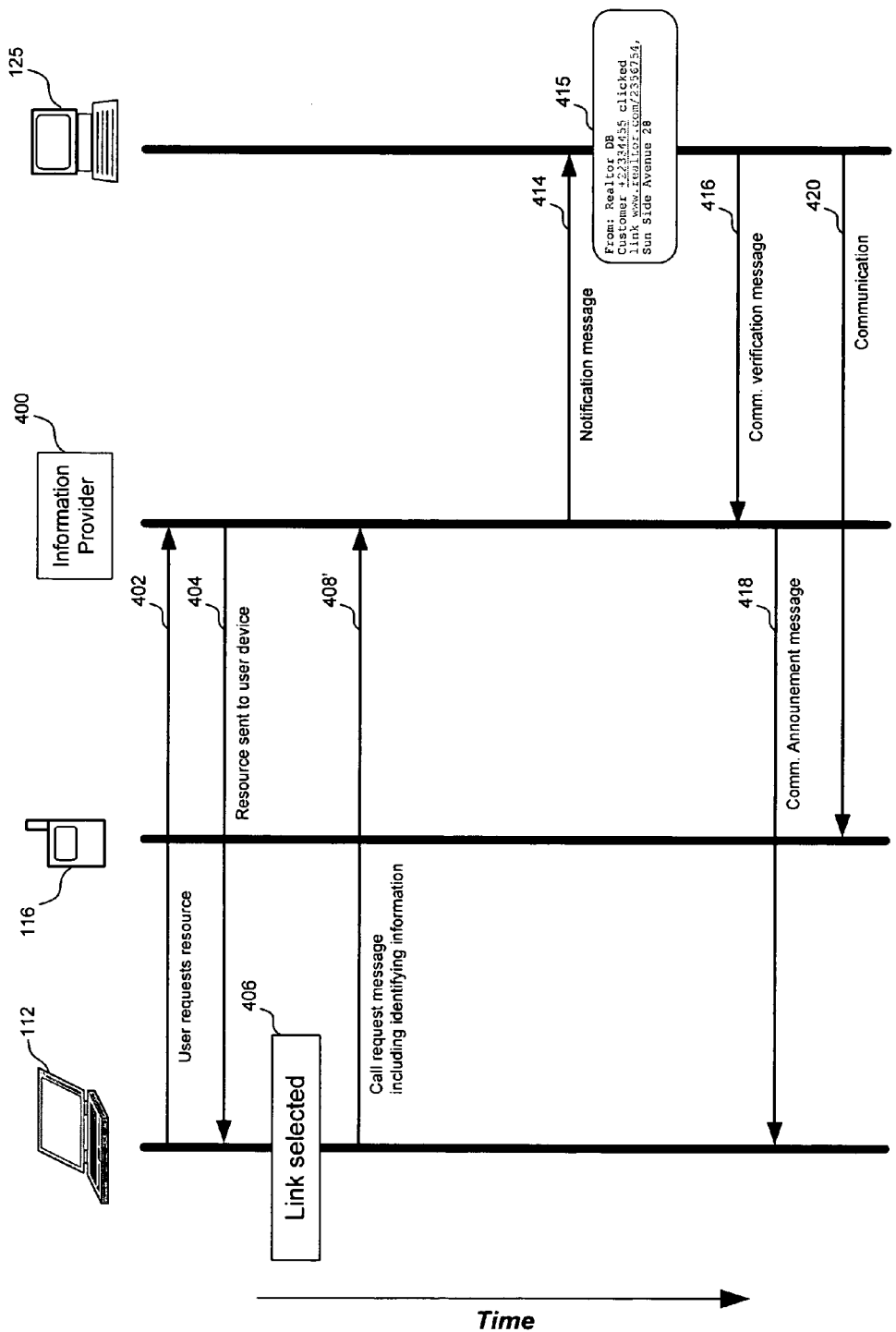

FIG. 4B is a diagram of an operation according to an embodiment of the present invention. This operation is similar to the operation of FIG. 4A. However, in FIG. 4B, step 408 is replaced with a step 408'. In addition, FIG. 4B does not include steps 410, and 412.

In step 408', a communication request message is generated and sent to information provider 400. This message includes identification information, such as a telephone number associated with the user (e.g., the number of user communications device 116). This information eliminates the need for identifying information to be solicited through the performance of steps 410 and 412. Additionally, step 408' may comprise identification information of user device 112, of user device 116, and/or of the user.

Figure 4C:
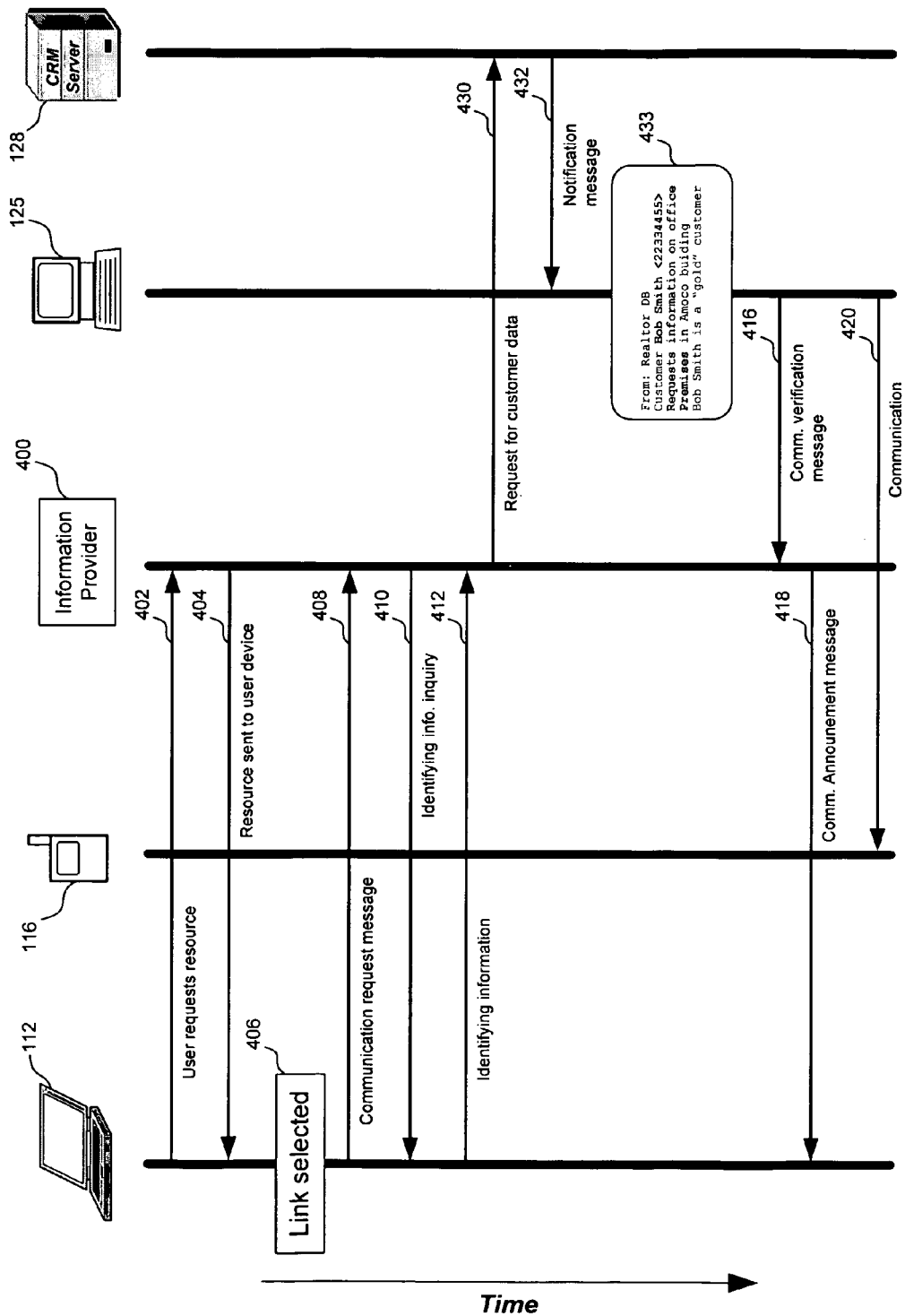

FIG. 4C is a diagram of an operational sequence according to an embodiment of the present invention. In this sequence, a content server and a CRM server (such as CRM server 128) interact to provide enhanced customer information. This sequence is similar to the sequence of FIG. 4A. For instance, in FIG. 4C, steps 402 through 412 are performed.

However, after information provider 400 receives the identifying information transmitted in step 412, a step 430 is performed. In this step, information provider 400 sends a request for customer data to CRM server 128. This request also includes information contained in the communication request message transmitted in step 408 and the phone number received in step 412.

Based on the information in this request, CRM server 128 retrieves corresponding information. For example, CRM server 128 may retrieve a customer name and/or address associated with the received phone number. In addition, CRM server 128 may also retrieve a corresponding customer status indicator (e.g., preferred customer).

CRM server 128 provides the realtor with a notification message in a step 432.

In a step 433, the contents of the notification message are displayed to the realtor. As shown in FIG. 4C, this notification message includes information contained in the communication request message transmitted in step 408 and the identifying information received in step 412. In addition, this message includes the information retrieved by CRM server 128. For instance, FIG. 4C shows that the notification message indicates that the customer's name is Bob Smith, and that he is a "gold" customer. Also, the notification indicates that the customer is interested in office space within a particular building.

Upon receipt of the communication notification message, FIG. 4C shows that the realtor sends a communication verification message to information provider 400 in step 416. In turn, information provider 400 sends a corresponding communication announcement message to the user device 112 in a step 418. This message provides an indication to the user that the realtor is placing a voice call to him. Accordingly, the realtor places a voice call to user communications device 116 in step 420. In embodiments, the communication announcement message and the communication occur at substantially the same time.

In an alternative embodiment of FIG. 4C, steps 408, 410 and 412 are performed between user device 112 and CRM server 128. Additionally, step 430 is performed between CRM server 128 and computing device 125. Also, step 416 may be performed between computer device 125 and CRM server 128, wherein CRM server 128 sends the communication announcement message.

Figure 4D:
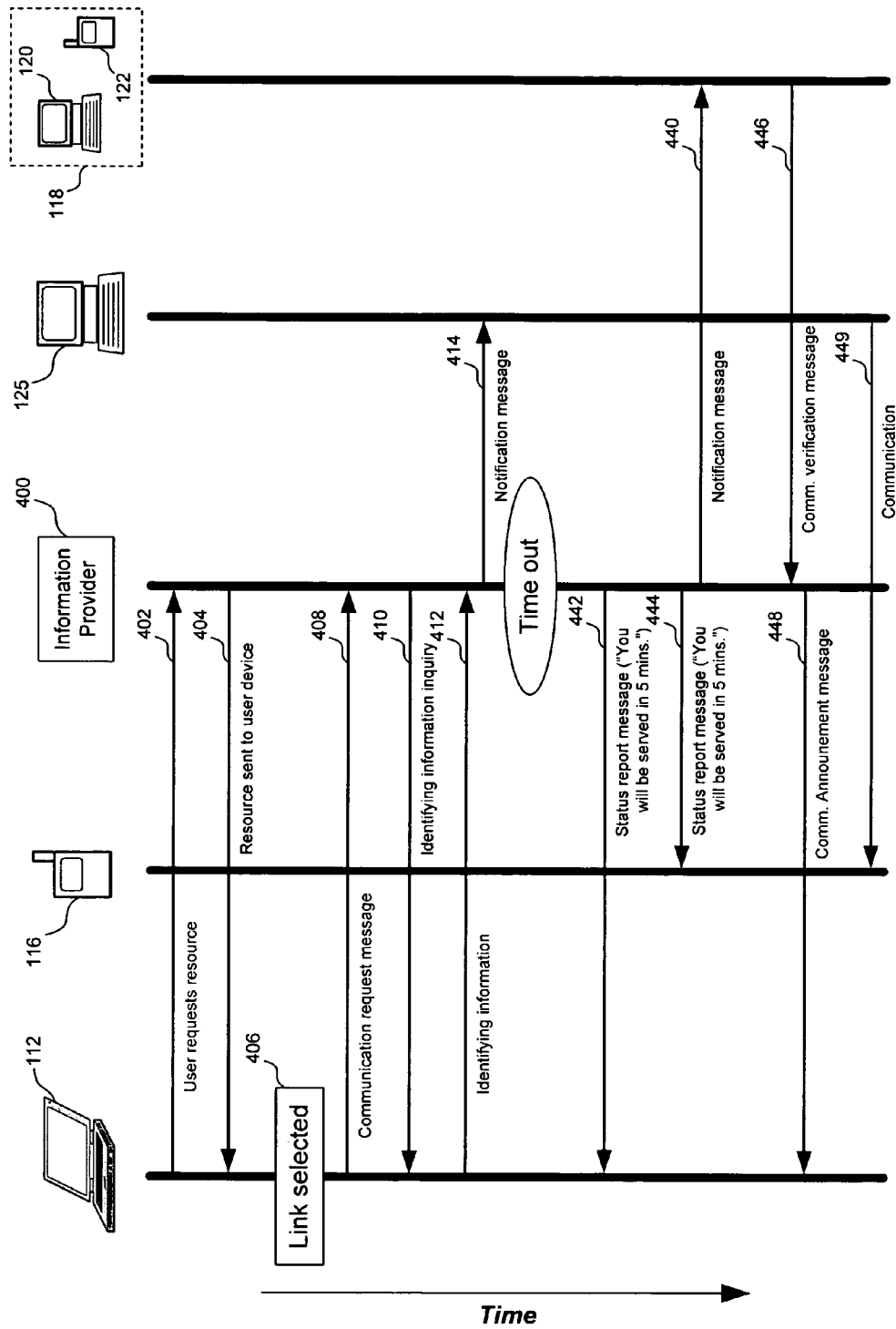

FIG. 4D is a diagram of a sequence according to an embodiment of the present invention. In this sequence, a communication is formed by dispatching an available realtor from among multiple realtors. This sequence is similar to the sequence of FIG. 4A. For instance, in FIG. 4C, steps 402 through 414 are performed. However, FIG. 4D shows that step 414 comprises sending a notification message to a first of multiple realtors.

If this realtor does not generates a communication verification message within a predetermined time interval, then information provider 400 sends a subsequent notification message to a second realtor in a step 440. Also, information provider 400 sends status report messages to the user to indicate that service will be forthcoming. For instance, FIG. 4D shows a step 442 in which a status report message (e.g., an e-mail or an instant message (such as an SMS message)) is sent to user device 112 indicating that the user will be served in five minutes. Also, FIG. 4D shows a step 444 in which a similar status report message is sent to user communications device 116. This message may be in various forms, such as a recorded voice call and/or a text message.

Upon receipt of the subsequent communication notification message, FIG. 4D shows that the realtor sends a communication verification message to information provider 400 in step 446. In turn, information provider 400 sends a corresponding communication announcement message to the user device 112 in a step 448. This message provides an indication to the user that the realtor is placing a voice call to him. Accordingly, the realtor places a communication (e.g., a voice call) to user communications device 116 in step 449. In embodiments, the communication announcement message and the communication occur at substantially the same time.

Figure 4E:
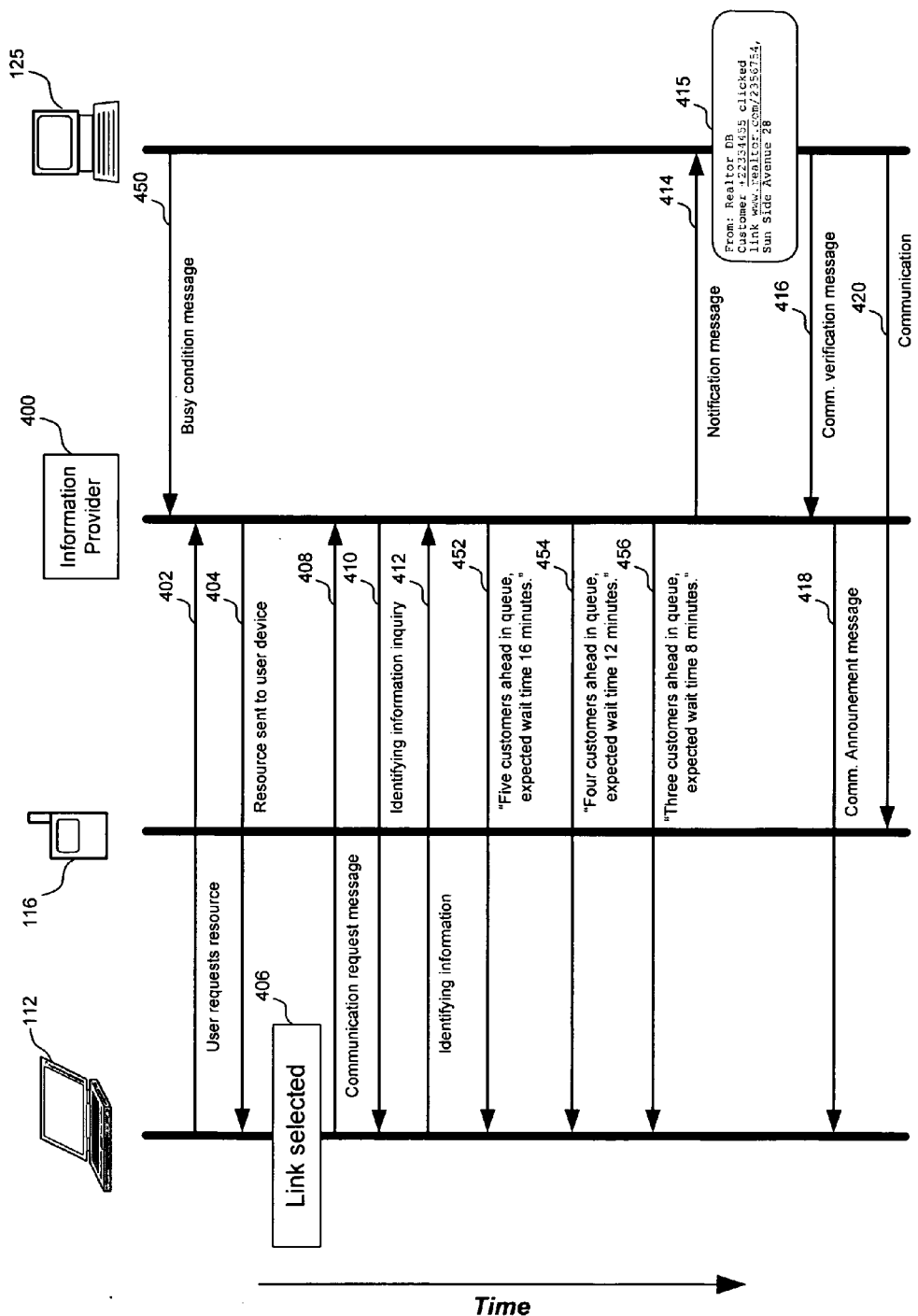

FIG. 4E is a diagram of an operational sequence according to an embodiment of the present invention. In this sequence, service is delayed and feedback is given to the user regarding upcoming service. The operation of FIG. 4E is similar to that of FIG. 4A. However, the realtor is currently servicing one or more communication requests and cannot immediately service a new request. Accordingly, in a step 450, the realtor sends a busy condition message to information provider 400. This message may include information, such as the number of communication requests that are currently pending with the realtor.

Following step 450, FIG. 4E shows that steps 402-412 are performed. However, after performance of step 412, operation proceeds to steps 452-456. In these steps, information provider 400 provides user device 112 with status messages regarding the communication request. The status messages may include an estimated wait time and the number of customers having priority in the realtor's queue. These messages may be in various forms, such as e-mails or an instant messages.

The status messages may be sent whenever the realtor completes a communication. For instance, the status message in step 452 indicates that there are five customers ahead in the queue and an expected wait time of 16 minutes. A short time later, the status message in step 454 indicates that there are four customers ahead in the queue and an expected wait time of 12 minutes. Then, the status message in step 456 indicates that there are three customers ahead in the queue and the expected wait time is eight minutes.

After all of the messages have been cleared from the realtor's queue, step 414 is performed. In this step, information provider 400 sends a notification message to the realtor indicating the circumstances of the user's communication request. Then, the realtor sends a communication verification message to information provider 400 in step 416. In turn, information provider 400 sends a corresponding communication announcement message to the user device 112 in a step 418. This message provides an indication to the user that the realtor is placing a communication (e.g., a voice call) to him. Accordingly, the realtor places a communication to user communications device 116 in step 420. In embodiments, the communication announcement message and the communication occur at substantially the same time.

Figure 4F:
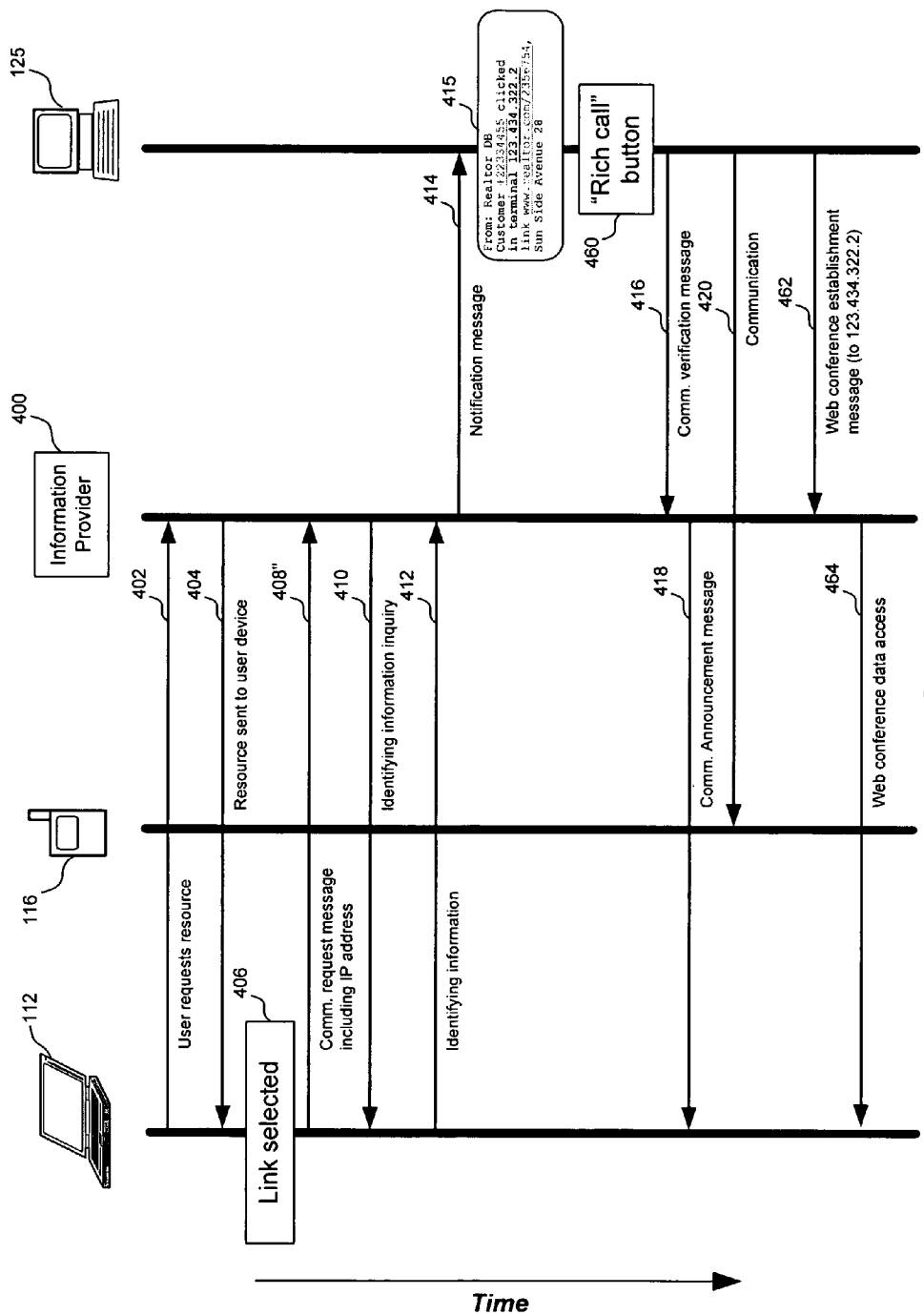

FIG. 4F is a diagram of an operational sequence according to an embodiment of the present invention. This sequence involves the creation of a "rich call" in which a phone connection and a web conference is established with the user. This operation includes steps 402 through 406, which result in the user obtaining a resource from information provider 400. As shown in FIG. 4F, a communication request link or a rich call link is selected in step 406. However, this selection results in a step 460 being performed. In this step, a communication request message 408" is sent to content server. As shown in FIG. 4F, this message includes an address, such as an IP address, associated with user device 112.

Following step 408", information provider 400 sends an identifying information (e.g., phone number) inquiry message to user device 112. In response to this inquiry message, sends to information provider 400 identifying information, such as a telephone number, that is associated with the user in step 412.

Next, information provider 400 sends a notification message to the realtor in step 414. As shown in FIG. 4F, this notification includes information involving the circumstances of the communication request message. For instance, this request may include the telephone number provided in step 412 and the IP address provided in step 408". Also, this request includes an identifier of the communication request link, a request for the rich call, as well as any additional information (i.e., link data) corresponding to the link.

The contents of the notification message are displayed to the realtor in a step 415.

In a step 460, the realtor selects a rich call, for example, by selecting a "rich call button". This selection initiates a voice call to user communications device 116 in step 420. In addition, this initiates a web conference with user device 112 in steps 462 and 464. For instance, in step 462, information provider 400 receives a web conference establishment message from the realtor. This message includes the address (e.g., IP address) of user device 112. Upon receipt of this message, user device 112 performs web conference data access in step 464. This web conference allows the user and the realtor to exchange, view, and share content (e.g., images, text, and audio) through information provider 400.

In alternate embodiments, a separate web conference server (not shown) is employed. Thus, in such embodiments, steps 462 and 464 would involve the web conference server and not information provider 400.

In FIGS. 4A-4F, a user device provides a server with identifying information, such as a phone number. This information may be provided in various ways. For instance, the user may enter this number manually. As an alternative, an Applet in the device's browser picks up the information from the device's memory, such as from an electronic business card. Also, an Applet in the device may obtain the information from the device with a proximity (e.g., Bluetooth) connection. In embodiments, the information is saved in a cookie that will be transmitted with the communication request (e.g., in step 408'). A further alternative exists when the page containing the communication request link requires authentication. In this case, the user profile stored on the service side may contain the identifying information. Thus, steps 408, 410, and 412 may be bypassed.

In embodiments employing cookies, information provider 400 (such as a CRM server) may add/create/send a cookie information to user device 112. The cookie may comprise information such as user ID, user password, user preferences, previous accesses to the service, previously used services, previously browsed services and links, archive shopping cart information, etc. This information helps information provider 400 track things, such as user preferences and data, that the user may submit while browsing the site.

For example, a cookie may include information about the purchases that the user makes. Thus, the next time, user device 112 accesses information provider 400, the cookie information is transmitted to information provider 400. With this feature, information provider 400 does not need to store all information pertaining to the user. Rather, such information may also be stored in the user device 112.

FIGS. 4A-4F are provided for purposes of illustration, and not limitation. Accordingly, variations and combinations of these sequences are within the scope of the present invention. For instance, instead of providing information provider 400 with a identifying information of user communications device 116 (e.g., in steps 412 and 408'), an address (e.g., Internet Protocol (IP) address) of user communications device 116 may alternatively or additionally be provided. This IP address may be used for an Internet-based communication as well as for additional data communications.

IV. Content Server

Figure 5:
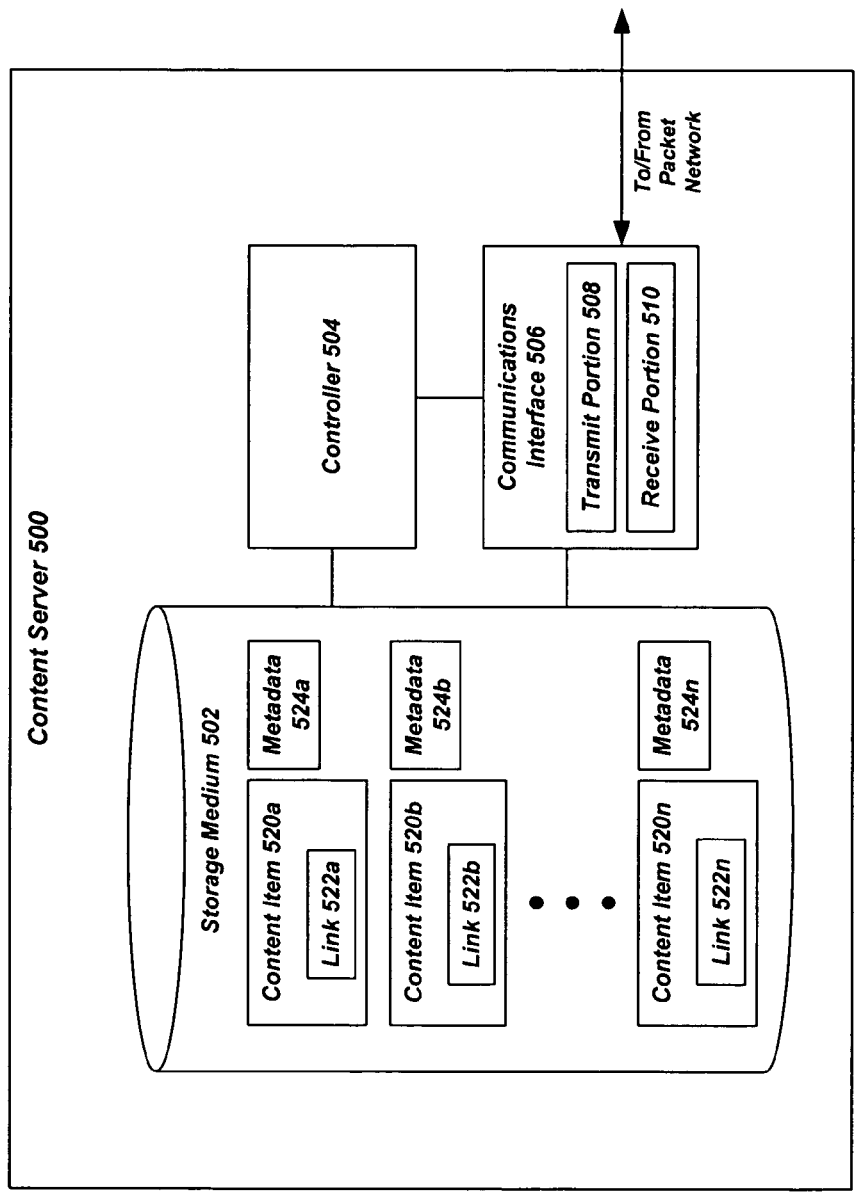
FIG. 5 is a diagram of a content server, according to aspects of the present invention.

FIG. 5 is a diagram of a content server 500, according to an embodiment of the present invention. As shown in FIG. 5, content server includes a storage medium 502, a communications interface 504, and a controller 506.

Storage medium 502 stores multiple resources (or content items) 520*a-n*. As shown in FIG. 5, each of these resources includes a communication request link 522. Activation of a link 522 by a user device commences the communication initiation techniques described herein.

For each of communication request links 522, storage medium 502 stores corresponding metadata 524. This metadata may include a resource identifier (e.g., URL) of the corresponding service provider, a link ID, a link type, a document ID, a document ID, a document type, a service identifier (e.g., a real estate or product offering associated with the link), or any combination of these. This metadata may be forwarded to a calling entity according to the techniques described herein.

Communications interface 504 provides content server 500 with the ability to exchange information across one or more communications networks. Examples of such networks include packet network 108. Accordingly, communications interface 506 performs various operations, such as physical (PHY) layer and media access control (MAC) layer operations. As shown in FIG. 5 communications interface 506 may include a transmit portion 508 and a receive portion 510 that respectively handle transmission and reception of information at one or more protocol layers. For instance, portions 508 and 510 may include electronics that allow for the transmission and reception of wireless signals, as well as for the modulation and demodulation of such signals. Moreover, portions 508 and 510 may include hardware, software, and firmware to handle such functions at various protocol layers.

Controller 504 is coupled to storage medium 502, and communications interface 506. Controller 504 receives and sends various messages via interface 506. Examples of messages that controller 504 may receive and send are listed below in Table 1.

TABLE 1

| Received Messages | Sent Messages |
| --- | --- |
| Resource requests from user devices | Content delivery messages to user devices |
| Communication request messages from user devices | identifying information inquiry messages to user devices |
| Identifying information from user devices (in response to inquiry messages) | Notification messages to calling parties |
| Communication verification messages from calling parties | Communication announcement messages to user devices |
| Busy condition messages from calling parties | Status report messages to user devices |
| Web conference establishment messages from calling parties | |

V. Communication Processing Stations

Figure 6A:
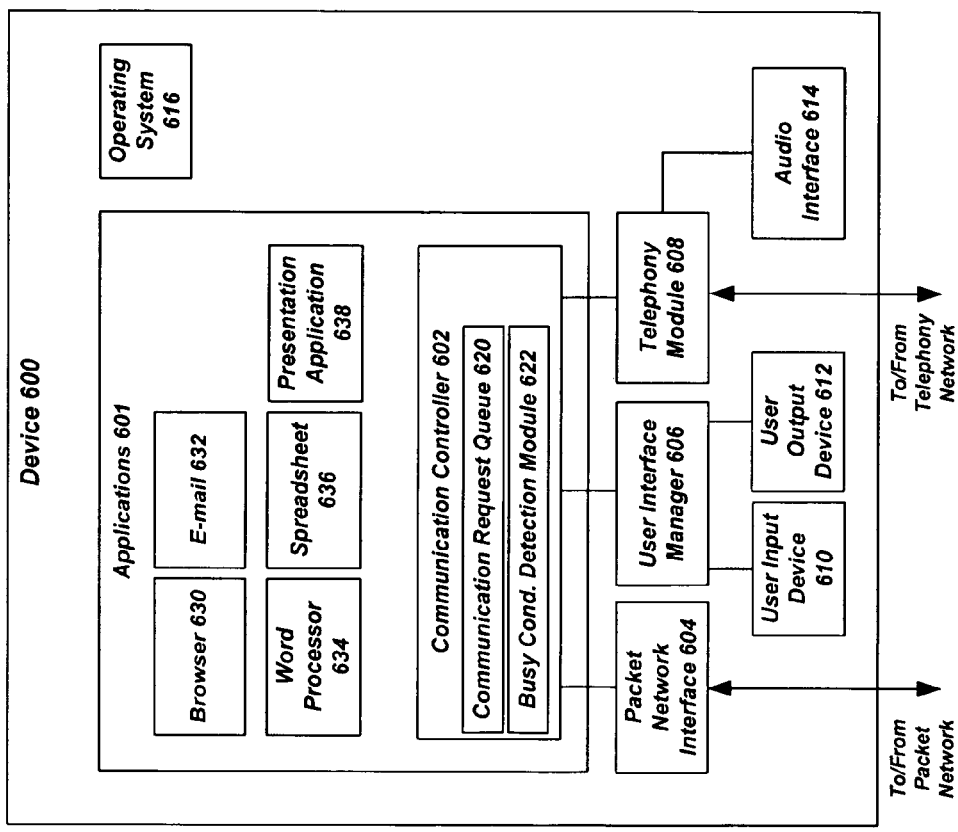
FIGS. 6A and 6B are diagrams of call processing devices, according to aspects of the present invention.

As described above with reference to FIG. 1, communication processing stations may be implemented with a single device or with multiple devices. FIG. 6A is a diagram showing an architecture of a single device communication processing station 600, according to an embodiment of the present invention. This architecture may be implemented in various types of devices, such as a personal computer or a mobile communications device (e.g., a cellular phone).

As shown in FIG. 6A, device 600 includes a plurality of applications 601, a packet network interface 604, a user interface manager 606, a telephony module 608, a user input device 610, a user output device 612, an audio interface 614, and an operating system 616. These elements may be implemented in hardware, software, firmware, or any combination thereof. For instance, many of these elements may be implemented with databases and software components that are in memory and executed by one or more processors.

Packet network interface 604 provides device 600 with the ability to exchange information across one or more communications networks. Examples of such networks include packet network 108. Accordingly, communications interface 504 performs various operations, such as physical (PHY) layer and media access control (MAC) layer operations.

Telephony module 608 interfaces with a telephony network, such as telephony network 110. Accordingly, telephony module 608 includes electronics that provide for the transmission of telephony signals. This telephony network may be wireless (e.g., cellular) or wired. In the case of wireless networks, telephony module 608 includes components, such as modulators, demodulators, amplifiers, and antenna(s) to provide for the exchange of wireless signals.

In addition, telephony module 608 performs operations, such as call set up, dialing, and call termination. These operations may be initiated by an operator through interaction with user interface devices, such as devices 610 and 612. Further, telephony module 608 exchanges voice signals with audio interface 614. Audio interface 614 provides a speaker and a microphone for an operator to engage in telephonic voice communications. Accordingly, audio interface 614 may be in the form of a headset or a handset.

User interface manager 606 controls user input device 610 and user output device 612. For instance, user interface manager 606 may provide a graphical user interface (GUI) that allows an operator to exchange information with device 600 through various interface devices (e.g., devices 610 and 612).

User input device 610 provides for the input of information by an operator. Examples of such information include text and data, as well as graphical user interface operations (such as menu item selections). Accordingly, user input device 610 may include a keyboard and a mouse. However, other devices, such as a touch screen, may be used.

User output device 612 provides information to an operator. Accordingly, user output device 612 may include a liquid crystal display or a cathode ray tube (CRT).

Applications 601 may include software, such as a browser 630, an e-mail application 632, a word processor 634, a spreadsheet application 636, and a presentation development application 638. These applications are shown for purposes of illustration, and not limitation. Accordingly, device 600 may include additional or alternative applications.

As shown in FIG. 6A, applications 601 also include communication controller 602. Communication controller 602 governs the placement of communications in response to communication request messages. FIG. 6A also shows that communication controller 602 includes a communication request queue 620. This queue stores communication request messages. Such messages may be received, for example, from content servers through packet network interface 604. These messages may be queued for processing, as described herein, according to various schemes (such as first-in first-out (FIFO)).

Communication controller 602 also includes a busy condition detection module 622. This module detects when device 600 has more than a predetermined number of pending communication requests (e.g., more than one) and issues a busy condition message to one or more content server(s), as described above with reference to FIG. 4E. In embodiments, this message is sent across a packet network via packet network interface 604.

Operating system 616 provides a software platform upon which other programs can operate. For instance, operating system 616 provides a file system and security features. Also, operating system 616 handles the allocation of processing resources among multiple processes. In addition, operating system 616 may provide various functional utilities that can be employed by other programs.

Figure 6B:
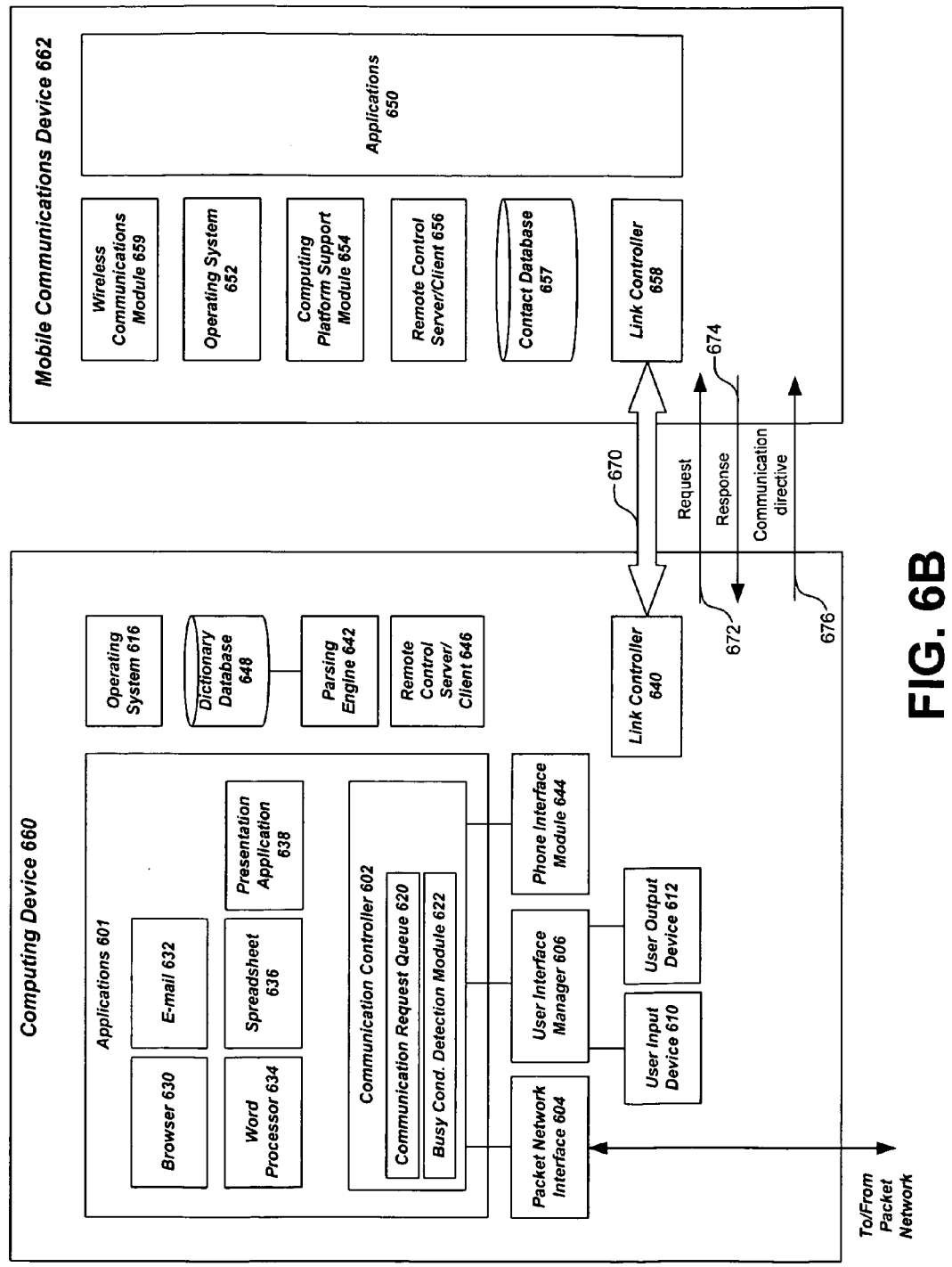

As described with reference to FIG. 1, communication processing stations may include multiple devices. Accordingly, FIG. 6B is a diagram showing an architecture of such an arrangement according to an embodiment of the present invention. This arrangement includes a computing device 660 and a mobile communications device 662. Together, these devices can efficiently initiate wireless communications, such as voice calls. These devices may be implemented with hardware, software, firmware, or any combination thereof. For instance, many components of these devices may be implemented with databases and software components that are in memory and executed by one or more processors within the corresponding devices.

As shown in FIG. 6B, devices 660 and 662 exchange information across a communications link 670. This link may be either wired or wireless. For instance, link 670 may utilize a cable connection, such as a USB interface or an Ethernet connection. Alternatively, link 670 may be provided by a short-range wireless communications network that utilizes wireless RF transmissions. Examples of such networks include Bluetooth, active or passive radio frequency identification (RFID), ultra wideband (UWB), wireless fidelity (WiFi), and WLAN. In further alternatives, link 670 may be provided through optical techniques. For instance, link 670 may be provided by an Infrared Data Association (IrDA) connection.

Devices 660 and 662 may exchange various messages across link 670. For example, FIG. 6B shows a request 672 sent from device 660 to 662. In embodiments, request 672 is directed at obtaining contact information from mobile communications device 662. Upon receipt of this request, device 662 searches one or more databases, such as its address book, to determine whether any entries satisfy request 672. If so, then mobile communications device 662 generates a response 674 that includes information from such entries. As shown in FIG. 6B, response 674 is sent to computing device 660 across link 670.

In addition, computing device 660 may send (across link 670) a communication directive 676 to mobile communications device 662. This directive instructs mobile communications device 662 to initiate wireless communications. For instance, directive 676 may instruct device 662 to place a communication, such as a phone call. These directives may include telephony AT commands generated by software tools. Examples of such software tools include currently available Gnokii, Gnapplet, and Gammu, which are toolkits that allow a Linux PC connected to a phone to make calls.

In embodiments of the present invention, such messages may be employed to provide efficient initiation of communications from information presented by applications running on computing device 660 (e.g., communication controller 602). In this case, the information is also transmitted across link 670.

For instance, information from a displayed notification message (e.g., a name, a telephone number, an address, etc.) may be selected by the operator of computing device 660. This results in an exchange of one or more messages. These message(s) convey a communications directive that is sent to mobile communications device 662. This selection of information may be performed by selecting a text string through a graphical user interface operating in computing device 660. Techniques for such selection and initiation of communications are described in copending U.S. application Ser. No. 11/137,475, filed on May 26, 2005, entitled "Automatic Initiation of Communications." This application is incorporated herein by reference in its entirety.

The architecture of FIG. 6B includes various modules. For instance, FIG. 6B shows computing device 660 being similar to the device of FIG. 6A. However, computing device 660 may not include telephony module 608 and audio interface 614. Instead, computing device 660 includes a link controller 640, a parsing engine 642, phone interface controller 644, a remote control server/client module 646, and a dictionary database 648.

Link controller 640 handles link level control and functionality for communications with mobile communications device 662 across communications link 206. For example, in Bluetooth implementations, link controller 640 handles link operations, such as device discovery, and paging. In handling these operations, link controller 640 interacts with hardware portions within computing device 660, such as wireless transceivers, interface circuitry, and/or the like.

In addition to communications link 670, computing device 660 may support communications links with other devices and networks, such as cellular data and telephony networks, as well as short-range wireless networks. Accordingly, a wireless communications module (not shown) controls the operation of components, such as transceivers, that provide for communications over such additional links.

Parsing engine 642 operates with one or more of applications 601 to identify potential communications contacts within a content item. Examples of content items include messages, such as the notification messages received in steps 414, 432, and 440 of FIGS. 4A-4F. For example, parsing engine 642 may search for names and formatted information.

Dictionary database 648 stores terms, such as common names and proper nouns. Parsing engine 642 may cross-reference these terms to identify potential contacts within a content item. Dictionary database 648 may be implemented in various ways. For example, this database may be a relational database, an object oriented database, or other suitable database implementation.

Phone interface controller 644 provides a user of computing device 660 with the capability to formulate queries or requests. These requests are submitted to mobile communications device 662. In response, computing device 660 may receive information from mobile communications device 662 including, for example, contact information and/or communications addresses. In addition, phone interface controller 644 may generate communications directives to be sent to mobile communications device 662.

Remote control server/client module 646 provides for computing device 660 to control (or be controlled by) another device, such as mobile communications device 662. Accordingly, module 646 may be implemented with Virtual Network Computing (VNC) software. VNC software allows a user of computing device 660 to view and interact with another device (the "server") using a simple client program (the "viewer").

FIG. 6B shows that mobile communications device 662 includes one or more applications 650, an operating system 652, computing platform support 654, a remote control server/client 656, a contact database 657, a link controller 658, and a wireless communications module 659.

Applications 650 may include personal information management applications, such as an address book, and/or a calendar.

Operating system 652 (like operating system 616) provides a software platform upon which other programs can operate. This is done by providing, for example, a file system, security features, mechanisms that allocate processing resources among multiple processes. In addition, operating system 652 may provide various functional utilities that can be employed by other programs.

Computing platform support module 654 may process messages received from computing device 660. Examples of such messages include request 672 and communications directive 676. In addition, computing platform support module 654 may process received requests and formulate responses, such as response 674. Also, computing platform support module 654 may trigger the initiation of communications in response to directives received from computing device 660.

Remote control server/client module 656 allows mobile communications device 662 to control (or be controlled by) another device, such as mobile communications device 660. Accordingly, module 656 may be implemented with VNC software.

Contact database 657 stores contact information for one or more contacts. Examples of such information include names, addresses, telephone numbers, SMS numbers, e-mail addresses, and web site addresses. Such contact information may be indexed according to names of persons and/or organizations. In embodiments, personal information applications may access this information. Contact database 657 may be implemented in various ways. For example, this database may be a relational database, an object oriented database, or other suitable database implementation. Contact database 657 may be dynamic. For instance, its contents may be acquired and updated through user interaction, from a peer device, and/or from a server.

Link controller 658 handles link level control and functionality for communications with computing device 660 across communications link 670. For example, in Bluetooth implementations, link controller 658 handles link operations, such as device discovery, and paging. In handling these operations, link controller 640 interacts with hardware portions within computing device 660, such as wireless transceivers, interface circuitry, and/or the like.

In addition to communications link 670, mobile communications device 660 supports communications links with other devices and networks, such as cellular data and telephony networks, as well as short-range wireless networks. Accordingly, wireless communications module 659 controls the operation of components, such as transceivers, that provide for communications over such additional links.

As described above, the architectures of FIGS. 6A and 6B may be implemented using software executing in devices 600, 660 and/or 662. Accordingly, these devices may each include a processor (such as one or more microprocessors) and memory. This software (also referred to herein as a computer program product) is stored in its corresponding device's memory and executed by its processor. Examples of such implementations are described below with reference to FIGS. 9 and 10.

However, the present invention may be implemented as control logic in software, firmware, hardware or any combination thereof. For example, in embodiments, the invention is implemented primarily in firmware and/or hardware using, for example, hardware components such as application specific integrated circuits (ASICs). Implementation of a hardware state machine to perform the functions described herein will be apparent to persons skilled in the relevant art(s).

VI. User Interface

Figure 7:
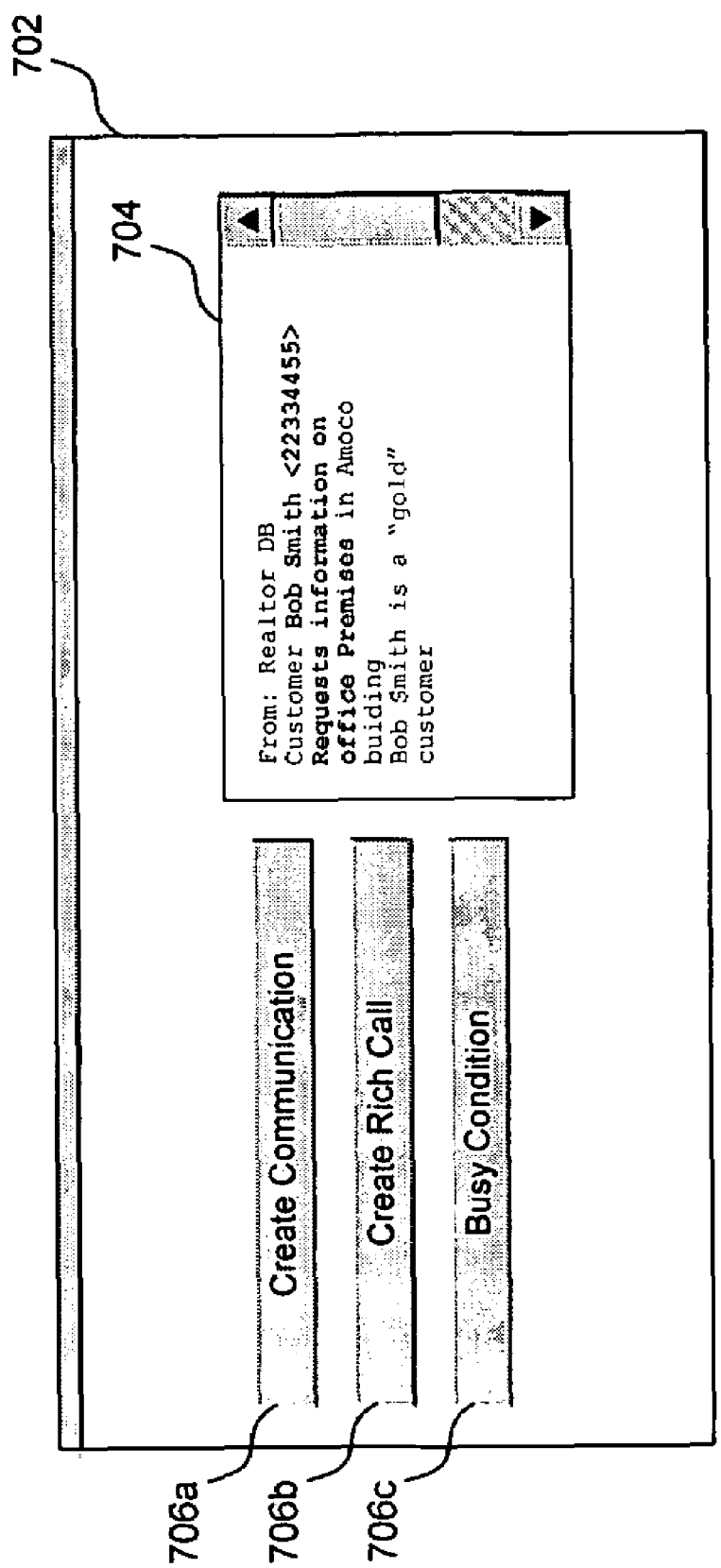
FIG. 7 is a diagram of an exemplary user interface, according to aspects of the present invention.

FIG. 7 is a view of a exemplary user interface, according to an embodiment of the present invention. This user interface may be displayed by call processing station devices (e.g., by devices 600 and 660). In embodiments, this interface may be provided by call controller 602. This user interface includes a window 702 that encompasses a message box 704, and multiple action buttons 706.

Message box 704 displays the content of messages in the form of text. In embodiments, these messages are notification messages, such as the messages received in steps 414, 432, and 440 of FIGS. 4A-4F.

As shown in FIG. 7, the displayed message identifies a customer's name, his telephone number, his interest in a particular property, and his status as a "gold" customer. From this information, the device operator may perform various actions.

For instance, the operator can create a communication (e.g., a call) to the customer by activating create communication button 706a. Additionally or alternatively, the operator can create a rich call by activating rich call button 706b when a packet network address (e.g., a URL) is available for the customer. As a further alternative, the operator can indicate (e.g., signal to the corresponding content server) that he is not available to place communications by activating busy condition button 706c. However, in embodiments, such busy condition indications may be made automatically.

When creating a communication by activating buttons 706a or 706b, the device may automatically identify a telephone number or network address from message box 704. Such automatic identification may be based on telephone numbers and network addresses being placed in a predetermined format that allows identification. Alternatively, an operator may select a telephone number and/or a network address through interaction with the user interface. For example, numbers and addresses can be highlighted by mouse, keyboard, and/or touchscreen operations. Once highlighted, buttons 706a or 706b may be activated. In further embodiments of the present invention, the operator may manually input (e.g., dial) a displayed number and/or address.

In embodiments, activation of such buttons causes a single device call processing station to place the corresponding call. However, for multiple device communication processing stations, this activation results in a communications directive being sent to a communications device (e.g., a wireless or wired telephone).

VII. Call Initiation with Multiple Devices

Figure 8:
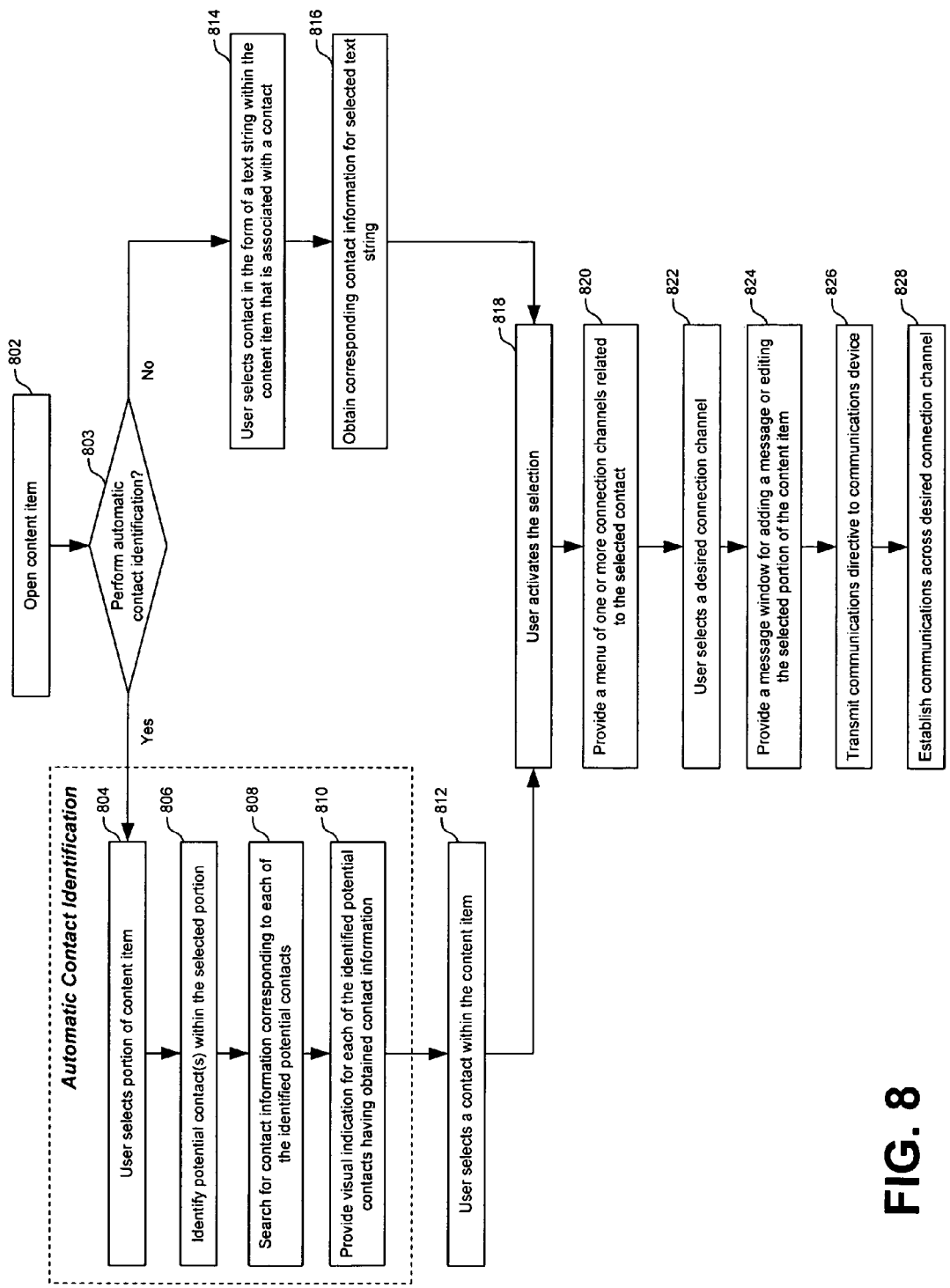
FIG. 8 is a flowchart of a communication operation involving two devices.

As described above, devices 660 and 662 may initiate communications according to techniques described in U.S. patent application Ser. No. 11/137,475. FIG. 8 is a flowchart illustrating such techniques according to an embodiment of the present invention. In particular, FIG. 8 shows an operation in which a computing device (such as computing device 660) and a communications device (such as mobile communications device 662) operate so that a communication (e.g., a voice call) is initiated by the communications device.

In a step 802, a user of the computing device opens a content item, such as a notification message. Alternatively, a user may select (e.g., highlight) a part of the content item. Based on information contained in this content item, the user may initiate communications. Accordingly, as indicated by a step 803, the user may initiate an automatic contact identification process. If the user initiates this process, operation proceeds to a step 804. Otherwise, operation proceeds to a step 814.

As shown in FIG. 8, the automatic contact identification process may include steps 804 through 810. In step 804, the user selects (e.g., highlights) a portion of the content item. For example, this selection may be a paragraph, a line of text, or one or more words. Alternatively, the user may select the entire content item.

In a step 806, one or more potential contacts within the selected portion of the content item are identified. With reference to the architecture of FIG. 6B, this step may comprise parsing engine 642 identifying formats (such as telephone numbers and e-mail addresses) that are indicative of communications addresses. In addition, this step may comprise parsing engine 642 operating with dictionary database 648 to identify names (e.g., names of people, businesses, entities, companies, products, brands, etc.) and/or contact information (e.g., telephone numbers, e-mail addresses, IP addresses, etc.) within the selected portion of the content item.

Following this identification, a step 808 searches for contact information corresponding to the potential contacts (e.g., names, and/or more information corresponding to the contact information). In embodiments, step 808 comprises the communication of information between devices. For example, this step may involve the computing device sending a request for contact information to the mobile communications device and/or to a server in a network. Accordingly, such a request may include the potential contacts (e.g., names, numbers, etc.) within the content item that were identified in step 806.

In response to this request, the mobile communications device or the network server searches (e.g., within contact database 657) for the corresponding contact information. Examples of such contact information include, for example, telephone numbers, SMS numbers, e-mail addresses, and uniform resource locators (URLs). The mobile communications device or network server then sends any such information to the computing device.

In embodiments, the mobile communications device may handle ambiguous partial matches of searches performed in step 808. For example, if a potential contact contains only a family name and there are two contacts stored by the mobile communications device having that family name, then both contacts could be sent to the computing device as corresponding contact information.

In a step 810, a visual indication corresponding to the identified contact information is provided within the content item. For example, special formatting may be applied to the potential contacts identified in step 806 that have corresponding contact information. Examples of such special formatting include highlighting, bolding, and/or underlining.

As shown in FIG. 8, a step 812 follows the contact identification process. In this step, the user of the computing device selects a contact within the content item. In particular, the user selects a contact corresponding to the visual indications provided in step 810. This selection may be made through interaction with a user interface device, such as a mouse, keyboard, and/or touch screen. For instance, this selection may involve a left mouse click. Alternatively, this selection may simply involve placing a mouse cursor at a contact.

As described above, when automatic contact identification is not performed, operation proceeds from step 803 to step 814. Accordingly, in step 814, the user selects contact in the form of a text string (i.e., one or more characters) within the content item that the user recognizes as being associated with a contact. This text string may be, for example, a recognizable name, telephone number, SMS number, e-mail address, or URL. This selection may be made through interaction with a user interface device, such as a mouse, keyboard, and/or touch screen. For instance, this selection may involve a left mouse click. Alternatively, this selection may simply involve placing a mouse cursor at a contact.

Following step 814, a step 816 is performed in which contact information corresponding to the selected text string is obtained. This contact information may include, for example, one or more communications channels (such as telephone numbers, SMS numbers, e-mail addresses, or URLs) and/or additional information that are associated with the text string.

In embodiments, step 816 comprises inter-device communication. For example, step 816 may involve the computing device sending a request for contact information to the mobile communications device. Accordingly, this request includes the text string selected in step 814. In response to this request, the mobile communications device searches (e.g., within its address book) for the corresponding contact information. The mobile communications device then sends any such information to the computing device.

FIG. 8 shows that a step 818 follows both steps 812 and 816. In step 818, the selection made in either of steps 812 or 814 is activated by the user. This step may involve interaction with a user interface device, such as a mouse, keyboard, and/or touch screen to provide communications options for the selected contact. For example, such interaction may include a right mouse click of the selected contact, or activation of buttons 706a and/or 706b. Alternatively, this selection may simply involve placing (or continuing to position) the mouse cursor at the selected contact to provide a pop pop-up window menu similar to tool tips).

a step 820, the computing device may provide the user with a menu. This menu displays one or more connection channels that are related to the selected contact. For instance, a selected contact may have multiple telephone and/or messaging numbers. Based on the menu provided in step 820, the user selects one of these connection channels in a step 822.

One of these connection channels may be indicated as a default channel to provide for efficient user selection. For instance, an abbreviated user input could be used to select the default connection channel. Also, in embodiments, techniques other than conventional menu-selection may be employed to select from among multiple channels. Such techniques may involve particular keystrokes and/or mouse actions. For example, a right mouse click on an identified contact may provide a submenu with the option to place a voice call and send an SMS message, while a left mouse click may initiate a call immediately. As a further example, a left mouse click while holding down the SHIFT key may send an SMS message.

As shown in FIG. 8, the user is provided with an opportunity in a step 824 to add a message or editing the portion of the content item that may have been selected in step 804. In embodiments, this opportunity is in the form of a message window.

In a step 826, the computing device transmits a communications directive to the mobile communications device. This directive includes the desired connection channel that was selected in step 822. According to this directive, a step 828 is performed in which the mobile communications device establishes communications across the desired connection channel.

VIII. Communications Device Implementation

Figure 9:
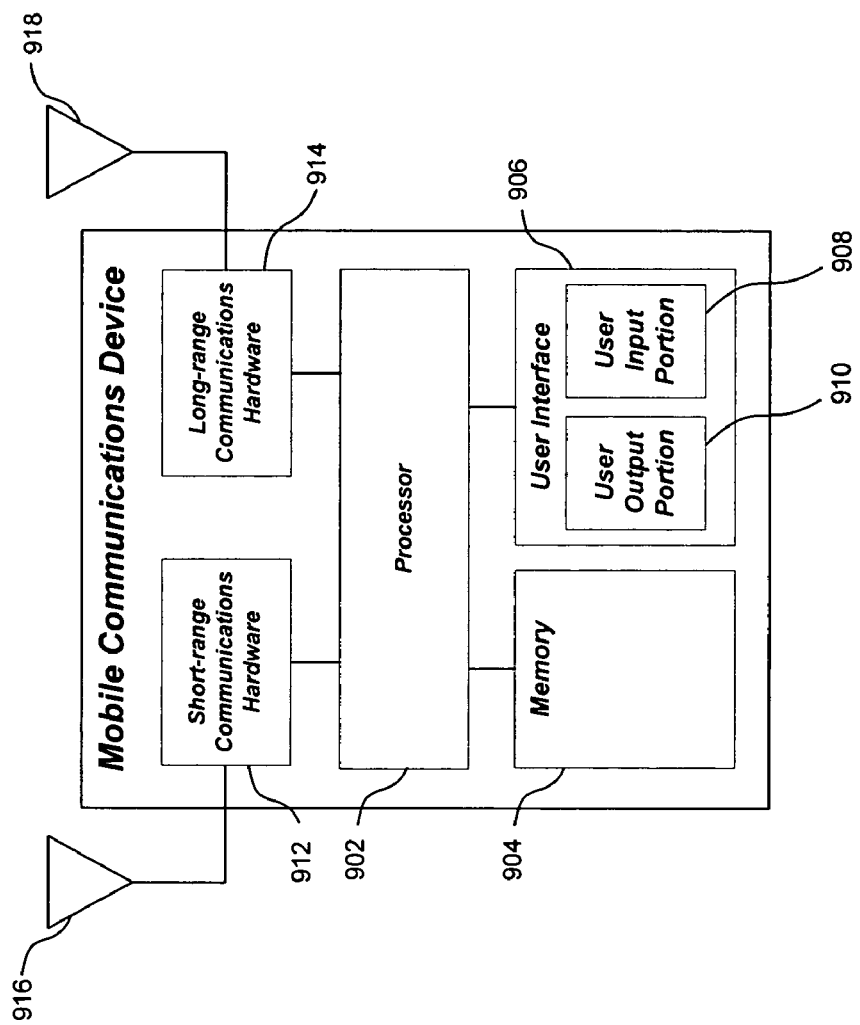
FIG. 9 is a diagram of an exemplary mobile communications device, according to embodiments of the present invention.

As described above, devices that employ features of the present invention may be implemented in hardware, software, firmware, or any combination thereof. For instance, one such implementation of mobile communications device 204 according to an embodiment of the present invention is shown in FIG. 9. This implementation may be employed for various devices, such as devices 116, 112, 600, and 662.

As shown in FIG. 9, this implementation includes a processor 902, a memory 904, and a user interface 906. In addition, the implementation of FIG. 9 includes a short-range communications hardware portion 912, a long-range communications hardware portion 914, as well as antennas 916 and 918. These components may be implemented as described above.

Processor 902 controls device operation. As shown in FIG. 9, processor 902 is coupled to hardware portions 912 and 914. Processor 902 may be implemented with one or more microprocessors that are each capable of executing software instructions stored in memory 904, for example, as a computer system.

Memory 904 includes random access memory (RAM), read only memory (ROM), and/or flash memory, and stores information in the form of data and software components (also referred to herein as modules). These software components include instructions that can be executed by processor 902. Various types of software components may be stored in memory 904. For instance, memory 904 may store software components that control the operation of hardware portions 912 and 914. Also, memory 904 may store software components that provide for the functionality of the device 204 elements shown in FIG. 3.

For instance, memory 904 may store components of user interface software 306 that control the exchange of information through user interface 906. As shown in FIG. 9, user interface 1214 is also coupled to processor 902. User interface 906 facilitates the exchange of information between the device and its user. Accordingly, FIG. 9 shows that user interface 906 includes a user input portion 908 and a user output portion 910.

User input portion 908 may include one or more devices that allow a user to input information. Examples of such devices include keypads, touch screens, and microphones. User output portion 910 allows a user to receive information from the device. Thus, user output portion 910 may include various devices, such as a display, and one or more audio speakers (e.g., stereo speakers) and a audio processor and/or amplifier to drive the speakers. Exemplary displays include color liquid crystal displays (LCDs), and color video displays.

FIG. 9 shows that short-range communications hardware portion 912 is coupled to antenna 916. Short-range communications hardware portion 912 includes electronics, such as transceivers, filters, and/or amplifiers. Such electronics allow the mobile communications device (in conjunction with antenna 912) to engage in bi-directional or unidirectional short-range RF communications with remote devices.

Examples of such short-range communications include Bluetooth, WLAN, UWB, WiFi, and RFID communications. Accordingly, in embodiments of the present invention, hardware portion 912 may include RFID tag and/or RFID reader components. Examples of such components may include transceivers, filters, and/or amplifiers. In addition, for passive tag capabilities, such components may include a coil for receiving power from interrogation signals.

Long-range communications hardware portion 914 is coupled to antenna 916 and includes electronics, such as a transceiver, which allows the device (in conjunction with antenna 916) to engage in bi-directional long-range RF communications. Such communications may include wireless telephony and data transfer with communications resources, such as cellular base stations and satellites.

The elements shown in FIG. 9 may be coupled according to various techniques. One such technique involves coupling hardware portions 912 and 916, processor 902, memory 904, and user interface 906 through one or more bus interfaces. In addition, each of these components is coupled to a power source, such as a removable and/or rechargeable battery pack (not shown).

IX. Computing Device Implementation

Figure 10:
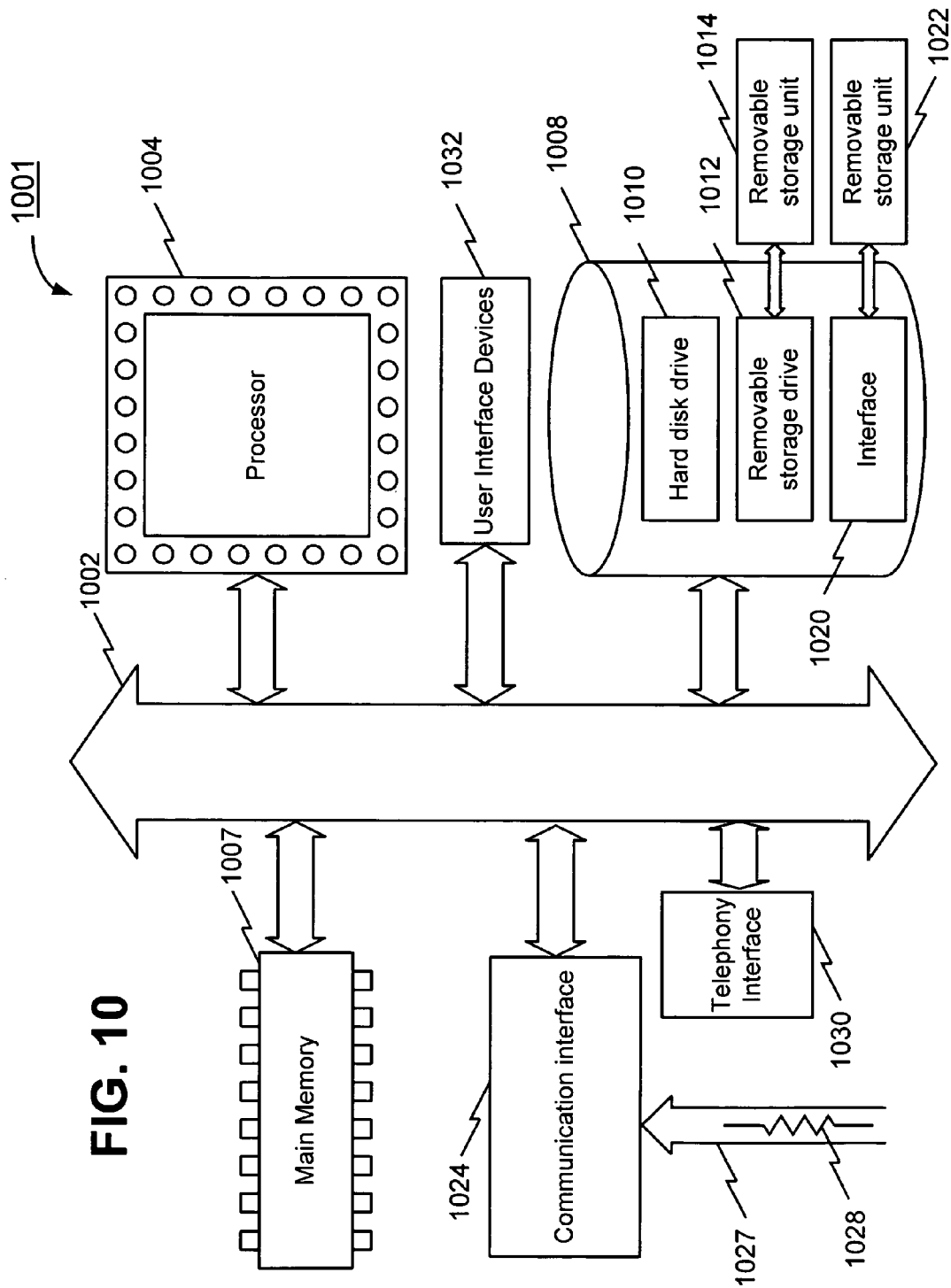
FIG. 10 is a diagram of an exemplary computer system, according to embodiments of the present invention.

An exemplary implementation of a computing device is shown in FIG. 10, according to an embodiment of the present invention. FIG. 10 shows a computer system 1001. This implementation may be employed for servers 126, 128, and 500. In addition, this implementation may be employed for devices 112, 120, 125, 600, and 660.

Computer system 1001 represents any single or multi-processor computer. Single-threaded and multi-threaded computers can be used. Unified or distributed memory systems can be used. Computer system 1001 includes one or more processors, such as processor 1004. One or more processors 1004 can execute software implementing the functionality described above. Each processor 1004 is connected to a communication infrastructure 1002 (for example, a communications bus, cross-bar, or network). Various software embodiments are described in terms of this exemplary computer system. After reading this description, it will become apparent to a person skilled in the relevant arts how to implement the invention using other computer systems and/or computer architectures.

Computer system 1001 also includes a main memory 1007 which is preferably random access memory (RAM). Computer system 1001 may also include a secondary memory 1008. Secondary memory 1008 may include, for example, a hard disk drive 1010 and/or a removable storage drive 1012, representing a floppy disk drive, a magnetic tape drive, an optical disk drive, etc. Removable storage drive 1012 reads from and/or writes to a removable storage unit 1014 in a well known manner. Removable storage unit 1014 represents a floppy disk, magnetic tape, optical disk, etc., which is read by and written to by removable storage drive 1012. As will be appreciated, the removable storage unit 1014 includes a computer usable storage medium having stored therein computer software and/or data.

In alternative embodiments, secondary memory 1008 may include other similar means for allowing computer programs or other instructions to be loaded into computer system 1001. Such means can include, for example, a removable storage unit 1022 and an interface 1020. Examples can include a program cartridge and cartridge interface (such as that found in video game devices), a removable memory chip (such as an EPROM, PROM, or flash memory) and associated socket, and other removable storage units 1022 and interfaces 1020 which allow software and data to be transferred from the removable storage unit 1022 to computer system 1001.

Computer system 1001 may also include a communications interface 1024. Communications interface 1024 allows software and data to be transferred between computer system 1001 and external devices via communications path 1027. Examples of communications interface 1024 include a modem, a network interface (such as Ethernet card), Bluetooth and/or other short-range wireless network modules, etc. In addition, communications interface 1024 may include an RFID reader and/or RFID tag.

Software and data transferred via communications interface 1024 are in the form of signals 1028 which can be electronic, electromagnetic, optical or other signals capable of being received by communications interface 1024, across communications path 1027. Note that communications interface 1024 provides a means by which computer system 1001 can interface to a network such as the Internet.

As shown in FIG. 10, computer system 1001 may include a telephony interface 1030. This interface provides for voice communications across various telecommunications and/or packet networks.

In addition, computer system 1001 includes user interface devices 1032. These devices allow a user or operator to exchange information with computer system 1001. In embodiments, user interface devices 1032 may incorporate the features of user input device 610, user output device 612, and audio interface 614.

The present invention can be implemented using software running (that is, executing) in an environment similar to that described above with respect to FIG. 10. In this document, the term "computer program product" is used to generally refer to removable storage units 1014 and 1022, a hard disk installed in hard disk drive 1010, or a signal carrying software over a communication path 1027 (wireless link or cable) to communication interface 1024. A computer useable medium can include magnetic media, optical media, or other recordable media, or media that transmits a carrier wave or other signal. These computer program products are means for providing software to computer system 1001.

Computer programs (also called computer control logic) are stored in main memory 1007 and/or secondary memory 1008. Computer programs can also be received via communications interface 1024. Such computer programs, when executed, enable the computer system 1001 to perform the features of the present invention as discussed herein. In particular, the computer programs, when executed, enable the processor 1004 to perform the features of the present invention. Accordingly, such computer programs represent controllers of the computer system 1001.

The present invention can be implemented as control logic in software, firmware, hardware or any combination thereof. In an embodiment where the invention is implemented using software, the software may be stored in a computer program product and loaded into computer system 1001 using removable storage drive 1012, hard drive 1010, or interface 1020. Alternatively, the computer program product may be downloaded to computer system 1001 over communications path 1027. The control logic (software), when executed by the one or more processors 1004, causes the processor(s) 1004 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

X. CRM Systems

As described above, aspects of the present invention employ customer relationship management (CRM) systems. CRM systems store data about customers to enable organizations to serve their customers more efficiently. For instance, many call centers use CRM software that automatically retrieves and enables editing of relevant data when customers call. Typically, call centers have a fixed location. In contrast, mobile phones can be used anywhere. For example, real estate agents often use their mobile phones on the field. Thus, mobile phones can be used in two radically different environments: in the office and on the move.

Employees of small companies often use mobile phones instead of conventional wired phones to communicate with their customers. Unfortunately, conventional CRM systems do not provide any support for mobile phones. Thus, small companies do not typically have call centers. However, aspects of the present invention advantageously provide for CRM systems to operate with mobile devices.

Figure 11:
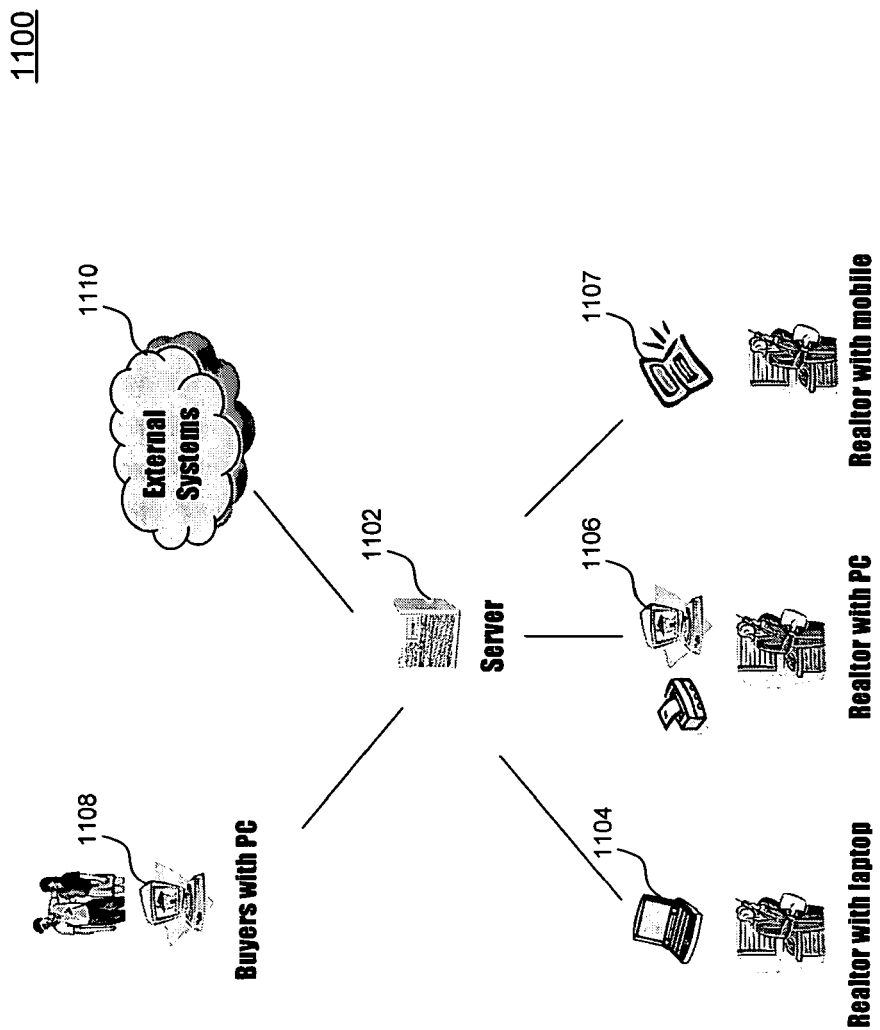
FIG. 11 is a diagram of an exemplary business system.

FIG. 11 is a diagram of an exemplary business (e.g., realtor) system 1100 according to aspects of the present invention. This system includes a CRM system 1102, a business laptop computer 1104, a business desktop computer 1106, a business mobile communications device 1107 (such as a wireless telephone, PDA, etc.), a remote customer computer 1108, and one or more external systems 1110.

As shown in FIG. 11, CRM system 1102 operates as a central element to system 1100. For instance, a customer may provide information to CRM system 1102 through the use of remote customer computer 1108. However, employees may provide CRM system 1102 with information as well as retrieve information from it through the use of devices 1104, 1106, and 1107.

External systems 1102 may also exchange information with CRM system 1102. Examples of such systems include external telephone number information systems (e.g., Fonecta), content servers (e.g., content server 126), financial systems, accounting systems, and credit agencies.

The present invention provides techniques for the use of mobile communications devices with CRM systems. These techniques include processes for when a mobile communications device is in an office, as well as processes for when the mobile communications device is out of the office.

Figure 12:
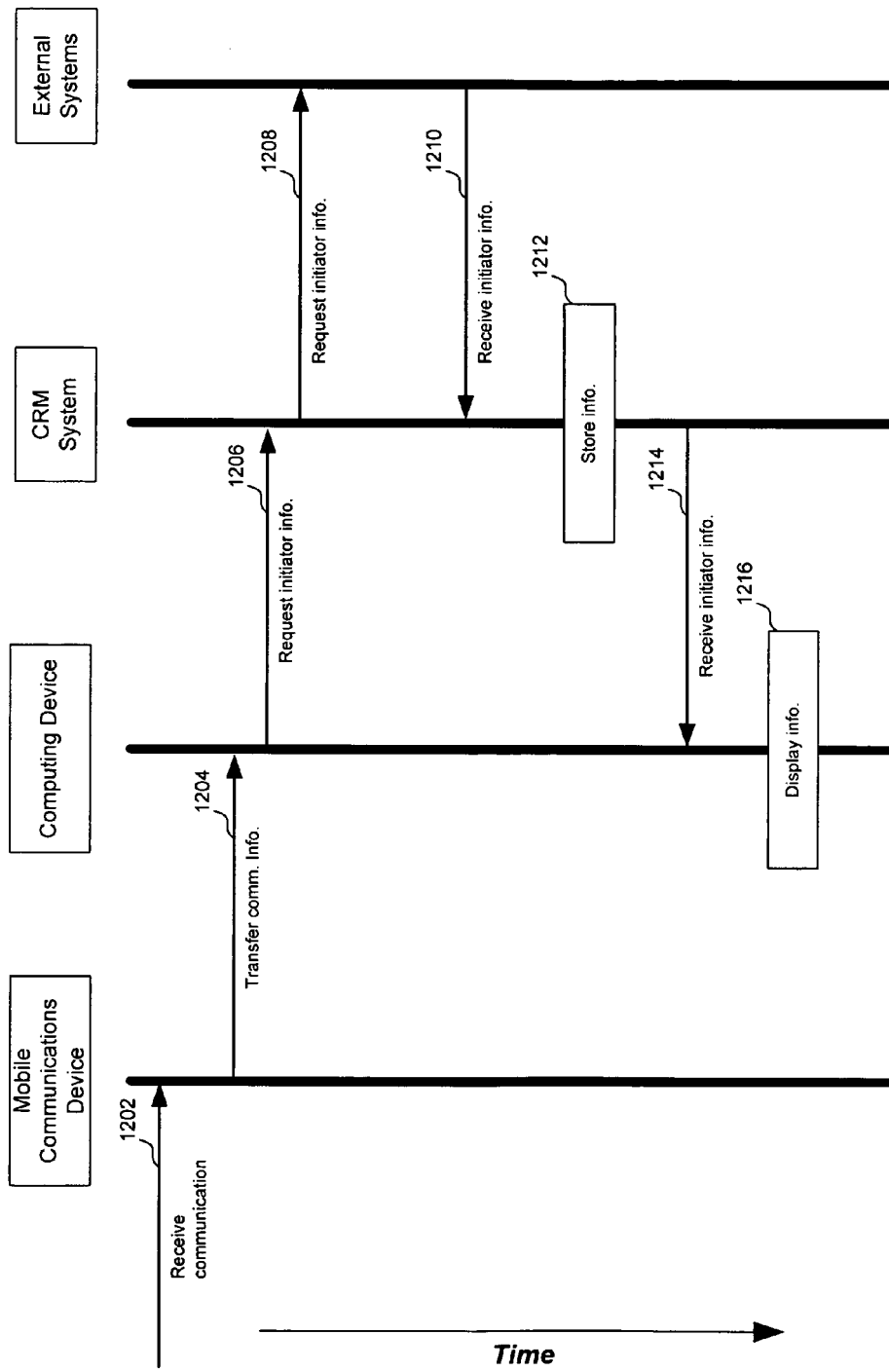
FIGS. 12-15 are diagrams of operations involving mobile devices and customer relationship management systems.
Figure 13:
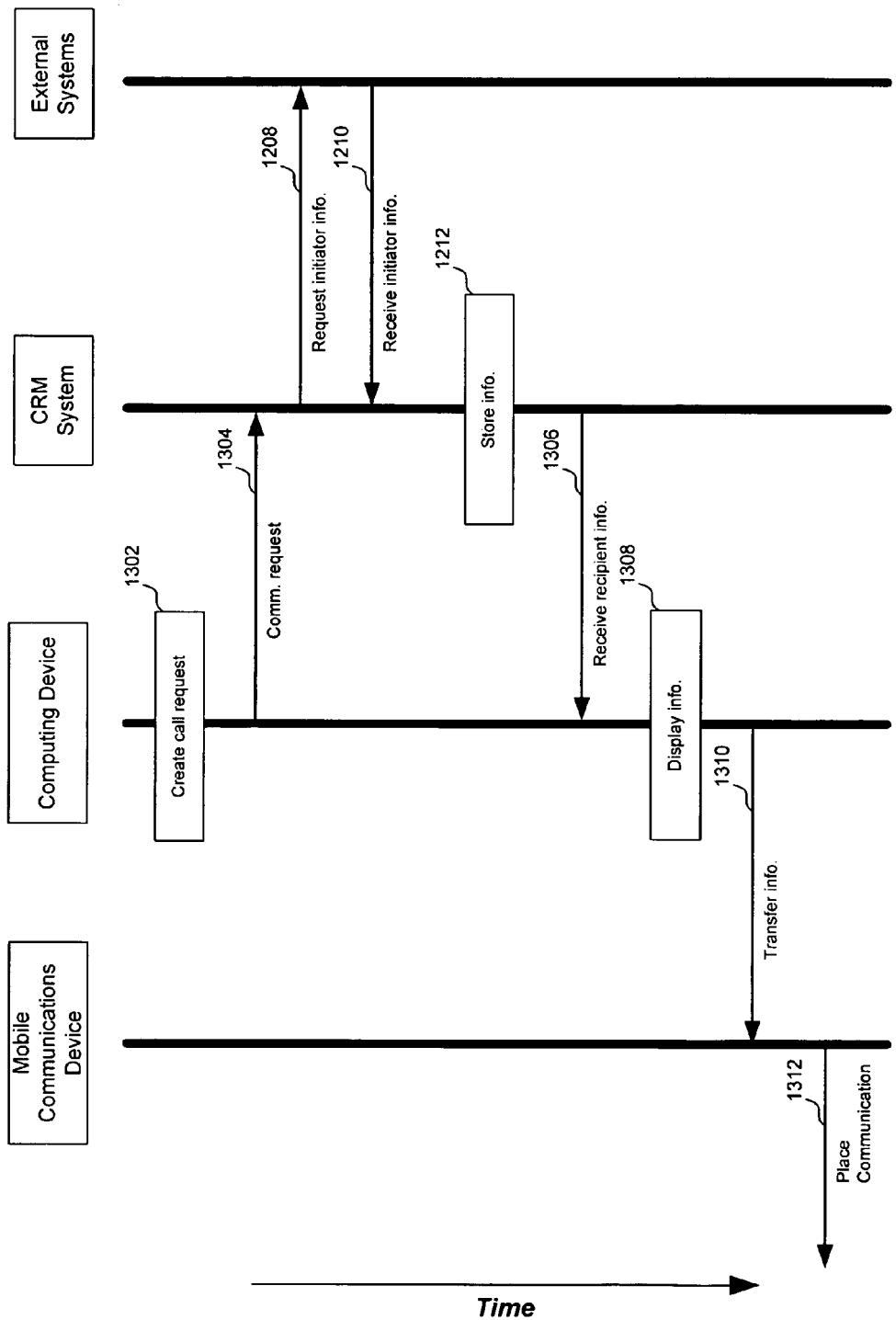

FIGS. 12 and 13 are diagrams illustrating operational sequences for when a mobile communications device is in the office. These sequences may be performed with system 1100, as well as with other alternative systems.

In the office, people use desktop computers for their work. Therefore, mobile phones are paired with these desktop computers. Thus, when someone arrives in the office, his/her mobile communications device (e.g., mobile phone) automatically connects to his/her computing device (e.g., computers 1104 and/or 1106). This connection may be through various wired or wireless techniques. Accordingly, in the sequences of FIGS. 12 and 13 an employee (or other user) operates both a mobile communications device and a computing device.

Turning now to FIG. 12, an incoming communication (e.g., a call or a message) is received by the mobile communications device in a step 1202. Next, in a step 1204, information regarding the incoming communication (e.g., a telephone or SMS number) is transferred to the computing device. Upon receiving this information, the computing device requests information regarding the communication's initiator (e.g., caller) from the CRM system in a step 1206.

The CRM system may store this information. Alternatively, the CRM system may retrieve this information from external systems (e.g., external databases). As described above, such systems may include telephone number information systems (e.g., Fonecta) as well as other types of systems. Accordingly, FIG. 12 shows optional steps 1208-1212. In step 1208, the CRM system transmits request(s) to one or more external systems. Next, in a step 1210, the CRM system receives this information. Accordingly, the CRM system stores this information in a step 1212.

In a step 1214, the CRM system transfers this caller information to the computing device. In turn the computing device displays the initiator information in a step 1216.

In the sequence of FIG. 13, an employee initiates an outgoing communication. As shown in FIG. 13, this sequence includes a step 1302 in which a communication (e.g., call) request is created through the computing device. This request may request include identifying information (e.g., a name and/or account number, etc.) of an intended recipient. Next, in a step 1304, the computing device sends a request to the CRM system for information (e.g., a telephone number) regarding the intended recipient of this communication. The CRM system may not possess such information. Accordingly, the CRM system may perform steps 1208-1212, as described above, to retrieve such information.

Next, in a step 1306, the CRM system sends information regarding the intended recipient to the computing device. This information is displayed by the computing device in a step 1308 and transferred to the mobile communications device in a step 1310. Upon receipt of this information, the mobile communications device may initiate the outgoing communication.

Figure 14:
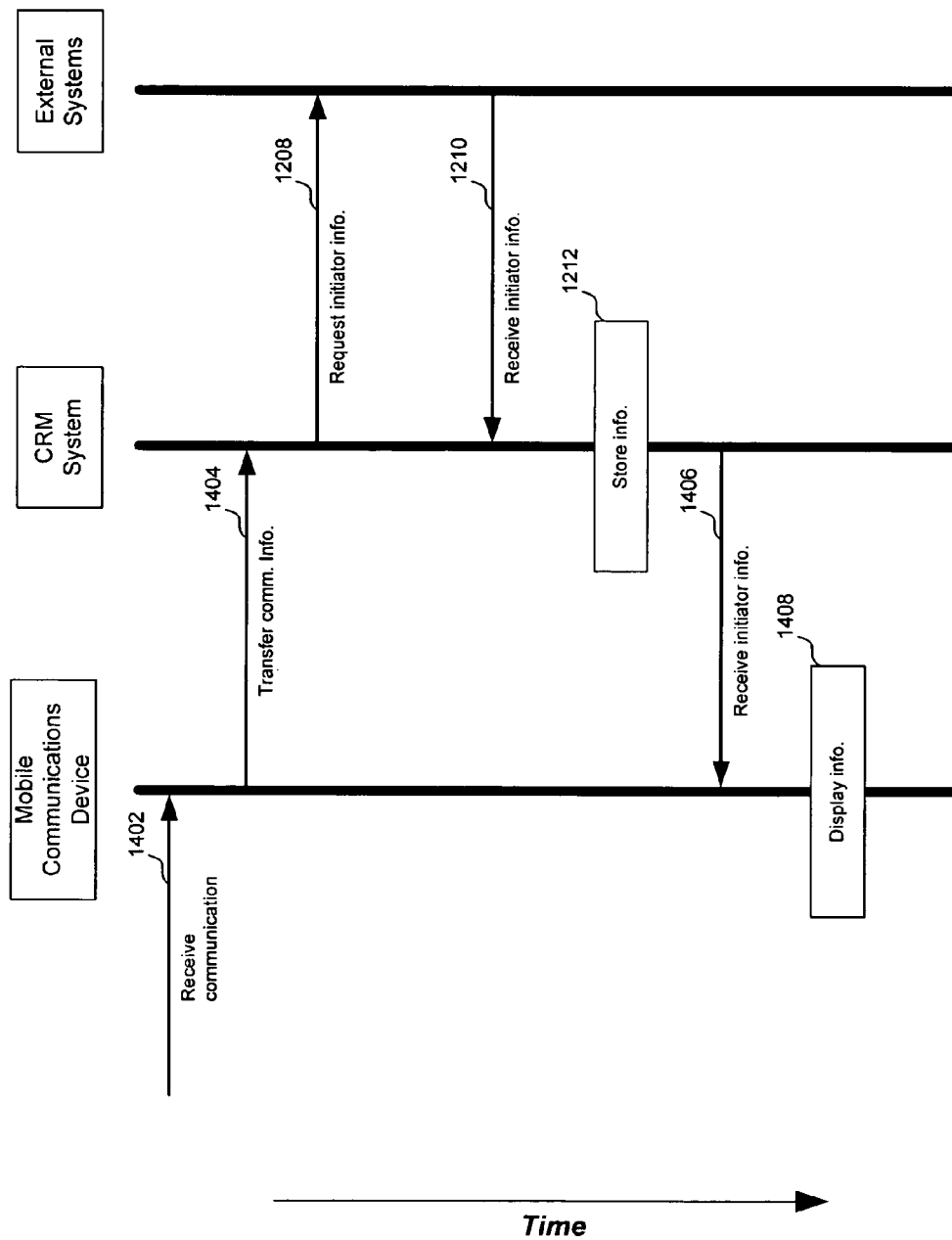
Figure 15:
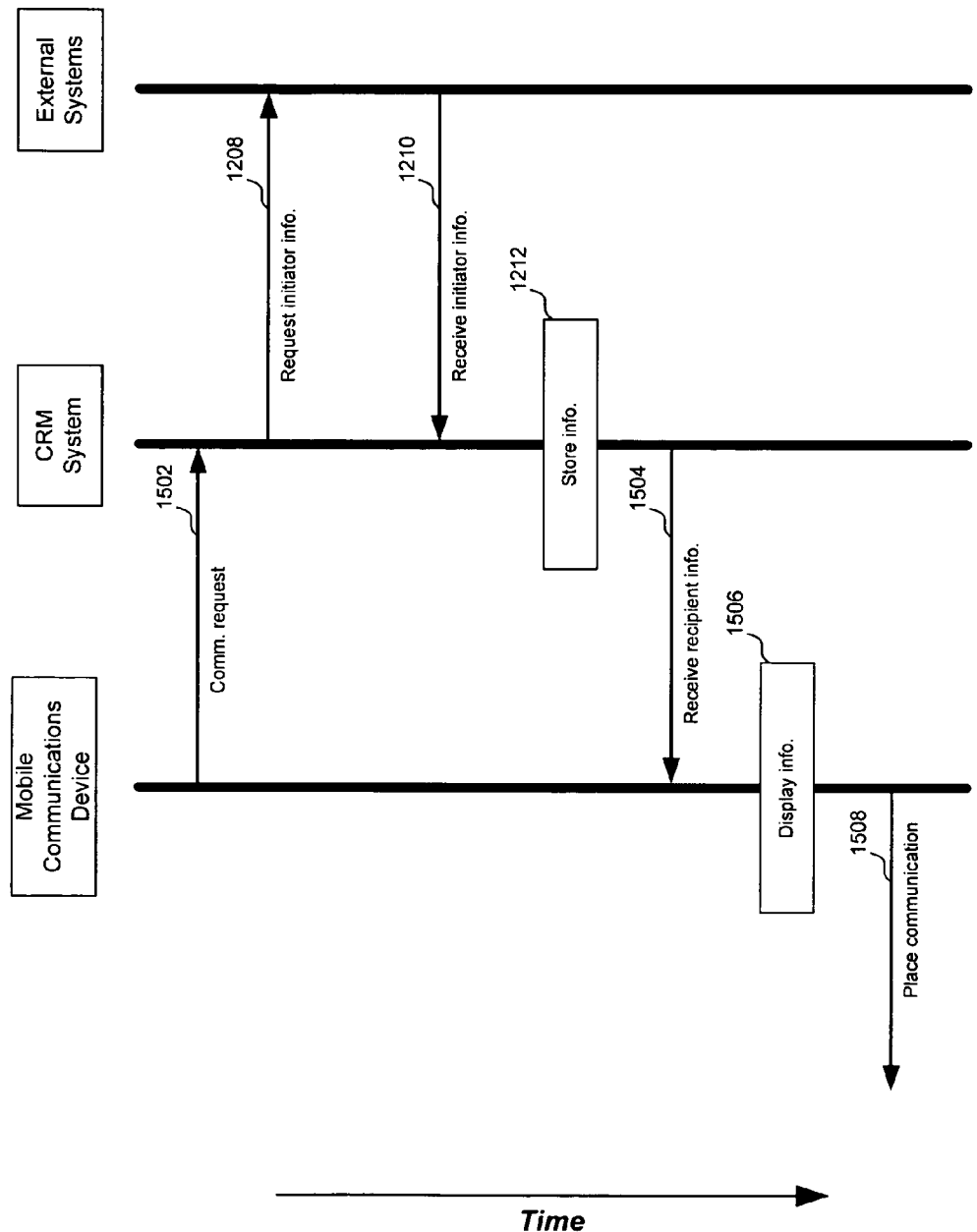

FIGS. 14 and 15 are diagrams illustrating operational sequences for when a mobile communications device is out of the office. This situation is also referred to herein as "on-the-move". When on-the-move, people do not have access to their office computing devices. Therefore, in this environment, the mobile communications device assumes the responsibilities of the computing devices. Thus, the CRM system can be accessed with the mobile communications device using a network connection. Such connections may involve wireless techniques, such as various cellular and short-range (e.g., Bluetooth, WLAN, etc.) technologies.

FIG. 14 shows a sequence involving the reception of a communication. Accordingly, in a step 1402 the mobile communications device receives a communication in a step 1402. Next, in a step 1404, the mobile communications device transfers information regarding this communication (e.g., a telephone or SMS number) to the CRM system.

Based on receipt of this information, the CRM system provides the mobile communications device with corresponding information regarding the communication's initiator (e.g., caller) in a step 1406. Upon receipt of the information sent, the mobile communications device displays this information in a step 1408.

The CRM system may not possess information regarding the communication's initiator during performance of step 1404. Accordingly, the CRM system may perform steps 1208-1212, as described above, to retrieve such information.

In the sequence of FIG. 15, an outgoing communication is initiated with the mobile communications device. This sequence includes a step 1502 in which the mobile communications device initiates a communications request, which is sent to the CRM system. This request may include identifying information (e.g., a name and/or account number, etc.) of an intended recipient. In response to this request, the CRM system sends information (e.g., a telephone number) regarding the intended recipient of this communication in a step 1504. Upon receipt of this information, the mobile communications device displays this information in a step 1506 and places the outgoing communication in a step 1508.

For on-the-move operation, if the information to be recorded is large (e.g., pictures, etc.), then data may be saved locally in the mobile communications device instead of uploading the information to the CRM system through a network connection. This locally saved information may be automatically updated the next time the mobile communications device connects to the office computing device. Also, server-side files may be attached to e-mails without downloading them through the network connection. The recipient, subject and text of the e-mail may be submitted to the system together with a list of attachment(s). The server assembles the e-mail and sends it.

For on-the-move operation, connections provided by certain wireless services (such as General Packet Radio Service (GPRS) may not currently work during calls due to current technical construction and features. However, in future products such problems may be solved. However, such shortcomings may result in an inability to fetch customer information through the network when a call comes in. However, such shortcomings do not affect the recording of call notes, since those can be submitted after the call.

To work around such problems, data for recent customers can be locally duplicated on the mobile communications device. This partial mirror of the CRM database may be synchronized periodically, preferably when the mobile phone is connected to an office computing platform. This happens automatically.

In embodiments, if the connection from the mobile phone to the network and to the CRM system is via WLAN it is technologically possible to receive voice (VoIP) and data via the same connection In the above sequences, a user or employee may enter notes. For instance, in FIGS. 12 and 13, a user or employee may enter notes in the computing device during incoming and outgoing communications. Similarly, in the sequences of FIGS. 14 and 15, notes may be entered in the mobile communications device during incoming and outgoing communications. These notes may pertain to the communications.

As described above, When communications (e.g., voice calls or SMSs) come in, relevant data is automatically displayed by devices in steps 1216 and 1408. Instead of the normal caller display customer name and related information is shown. An example of such information includes the property of the caller in case of a real estate agency.

The above sequences illustrate communications being sent by mobile communications devices and/or computing devices. Also, in aspects of the present invention, communications, such as messages (e.g., SMSs) may be initiated from a CRM system.

The above sequences may involve various types of communications. These communications may include voice calls, messages, e-mails, as well as other types of communications.

In embodiments, every communication event (voice calls, SMSs, e-mails) is recorded in the CRM system. Also (through user or employ interaction with mobile communications devices and/or computing devices) textual and/or recorded voice notes may be attached to these events in the CRM system. Moreover, the above techniques are not limited to offices and businesses, but may be applied in various organizations and settings.

Also, as alternatives to the techniques of FIGS. 4A and 4B communications requests may be sent directly from a customer to an employee's personal device (e.g., a mobile communications device or a computing device). This personal device then requests information from a CRM system and/or a content server.

Also, in aspects, the mobile communications device may include a contact database ("phonebook") that contains data about the most recent and most important customers. These contacts may be automatically organized into groups based on the information found in the CRM system. For example, a real estate agent's device may have a buyers and a sellers group of recent customers.

A mobile communications device such as the devices described with reference to FIGS. 11-15, may be implemented in the manner described above with reference to FIGS. 6A, 6B, and 9. Also, computing devices and CRM systems of the present invention may be implemented as a computer system, such as the computer system of FIG. 10.

Moreover, a CRM system may be implemented as a distributed system, including a server and multiple clients. For instance, users may interact with the system through clients from the computing devices (e.g., PCs) and mobile phones. These clients can be separate applications (called fat clients), or web browsers (called thin clients). The latter advantageously spares developers from the effort required to create special client applications. However, thin clients can sometimes be less flexible with respect to user interaction possibilities. Moreover, further embodiments may employ mixed implementations having both fat and thin clients.

XI. Conclusion

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention.

For example, in embodiments a user may use a single device having browsing and telephony capabilities to make a call request and receive a call according to the techniques described herein. Also, notification messages (such as messages received in steps 414 and 432) may also provide further information, such as a URL (or link) leading to further information regarding the customer. This information may be provided by a CRM server.

Thus, the breadth and scope of the present invention should not be limited by any of the above-described exemplary embodiments, but should be defined only in accordance with the following claims and their equivalents.

What is claimed is:

1. A method, comprising:
   selecting, at a first user device, a link in a resource;
   determining to transmit, from the first user device, a communications request to a server, the communications request based on the link;
   receiving, at the first user device, from a second user device identification information of the second user device;
   determining to transmit, from the first user device to the server the identification information of the second user device and specification of one or more capabilities of the second user device,
      wherein the link does not include identification of a remote device; and
   determining that the first user device will participate in a data conference with the remote device.

2. The method of claim 1, further comprising receiving a communication announcement message at the first user device from the server according to the communication request and the identification information.

3. The method of claim 1, wherein the identification information of the second user device includes contact information of the second user device.

4. The method of claim 1, wherein the first user device is a personal computer.

5. The method of claim 1, wherein the link is a communications request link.

6. The method of claim 1, wherein metadata is associated with the link, the metadata comprising one or more of a resource identifier of the server, an identifier of the link, an identifier of the resource, the type of the resource, and a service associated with the link.

7. The method of claim 6, wherein the communications request includes the metadata.

8. The method of claim 1, wherein the communications request includes information regarding the first user device, the information comprising one or more of an identification of a user of the first user device, contact information of the user of the first user device, a time stamp, a location of the first user device, a type of the second user device, a context of the first user device, and a status of the user of the first user device.

9. The method of claim 1, further comprising receiving at the first user device, a request from the server for the contact information of the second user device.

10. The method of claim 1, wherein the second user device is a mobile communications device.

11. The method of claim 1, wherein the identification information is a telephone number of the second user device.

12. The method of claim 1, wherein the identification information is an Internet Protocol address of the second user device.

13. A user apparatus, comprising:
   at least one processor; and
   at least one memory including computer program code, the at least one memory and the computer program code configured to, with the at least one processor, cause the user apparatus at least to perform:
   receive, at the user apparatus, a user selection of a link in a resource,
   determine to transmit, from the user apparatus, a communication request to a server, the communications request based on the link;
   receive, at the user apparatus, from a second user device identification information of the second user device;
   determine to transmit, from the user apparatus to the server the identification information of the second user device and specification of one or more capabilities of the second user device,
   receive, at the user apparatus, a communication announcement message from the server according to the communication request and the identification information, the announcement message responsive to a communication verification message sent by a remote device, wherein the link does not include identification of the remote device, and
   determine that the user apparatus will participate in a data conference with the remote device.

14. A method, comprising:
   receiving, at a server, a communications request from a first user device, the communications request based on a link in a resource selected at the first user device;
   receiving, at the server from the first user device, identification information of a second user device;
   selecting, at the server, a remote device, wherein the selection takes into account a context of the first user device and one or more dynamic properties of the remote device;
   determining, at the server, identification information of the remote device;
   determining to direct, from the server to the identification information of the remote device, the identification information of the second user device and information regarding the communication request, wherein the link does not include identification of the remote device;
   receiving, at the server, a communication verification message from the remote device; and
   determining, in response to the communication verification message, to send, from the server, a communication announcement message to the first user device according to the communication request and the identification information.

15. The method of claim 14 further comprising determining to search contact information of the second user device in the server based on the identification information of the second user device.

16. The method of claim 15, wherein the searching comprises searching information stored by the server.

17. The method of claim 14, further comprising:
determining to send an identifying information inquiry message to the first user device; and
wherein the receiving at the server from the first user device is in response to the identifying information inquiry message.

18. The method of claim 14, wherein the communications request includes information regarding the first user device, the information comprising one or more of an identification of a user of the first user device, contact information of the user of the first user device, a time stamp, a location of the first user device, a type of the second user device, the context of the first user device, and a status of the user of the first user device.

19. The method of claim 14, further comprising determining to send to the first user device, a request for the identification information of the second user device.

20. The method of claim 14, wherein the second user device is a mobile communications device.

21. The method of claim 14, wherein the identifying information includes a telephone number of the second user device.

22. A server apparatus, comprising:
at least one processor; and
at least one memory including computer program code, the at least one memory and the computer program code configured to, with the at least one processor, cause the server apparatus at least to perform:
receive, at the server apparatus, a communications request from a first user device, the communications request based on a link in a resource selected at the first user device;
receive, at the server apparatus from the first user device, identification information of a second user device;
select, at the server apparatus, a remote device, wherein the selection takes into account a context of the first user device and one or more dynamic properties of the remote device;
determine, at the server apparatus, identification information of the remote device;
determine to direct, from the server apparatus to the identification information of the remote device, the identification information of the second user device and information regarding the communication request, wherein the link does not include identification of the remote device;
receive, at the server apparatus, a communication verification message from the remote device; and
determine in response to the communication verification message, to send, from the server apparatus, a communication announcement message to the first user device according to the communication request and the identifying information.

23. A method, comprising:
receiving, at a remote device from a server, information regarding a communication request originated by a first user device and identifying information of a second user device, wherein the communication request is based on a link in a resource selected at the first user device, wherein the remote device corresponds to a context of the first user device;
determining to display, at the remote device, the identifying information and the information regarding the communication request;
determining, in response to an operator selection, to send, from the remote device, a communication verification message to the server;
determining, in response to the operator selection, to place, from the remote device, a communication response to a second user device, the communication response in accordance with the identifying information and the information regarding the communication request;
determining to attach, at the remote device, a note to the communication response; and
determining to record, from the remote device to a customer relationship management (CRM) server, the communication response and the attached note.

24. The method of claim 23, wherein the communication response is a telephone call.

25. The method of claim 23 wherein the communication response is a rich call.

26. The method of claim 23, wherein the link is a communication request link.

27. The method of claim 23, wherein the information regarding the communication request comprises one or more of a resource identifier of the server, an identifier of the link, an identifier of the resource, the type of the resource, and a service associated with the link.

28. The method of claim 23, wherein the information regarding the communication request comprises one or more of an identification of a user of the first user device, contact information of the user of the first user device, a time stamp, a location of the first user device, a type of the second user device, the context of the first user device, and a status of the user of the first user device.

29. The method of claim 23, further comprising receiving from the customer relationship management (CRM) server information corresponding to the contact information.

30. The method of claim 29, wherein the information corresponding to the identification information includes one or more of a customer name and an address associated with the contact information.

31. The method of claim 23, further comprising determining to establish a web conference with the first user device.

32. The method of claim 23, further comprising determining to send a busy condition message to the server when one or more call requests are currently being serviced.

33. A remote apparatus, comprising:
at least one processor; and
at least one memory including computer program code, the at least one memory and the computer program code configured to, with the at least one processor, cause the remote apparatus at least to perform:
receive at the remote apparatus, from a server, information regarding a communication request originated by a first user device and identifying information of a second user device, wherein the communication request is based on a link in a resource selected at the first user device, wherein the remote apparatus corresponds to a context of the first user device,
determine to display, at the remote apparatus, the identifying information and the information regarding the communication request;
determine, in response to an operator selection, to place, from the remote apparatus, a communication response to a second user device, the communication response in accordance with the contact information and the information regarding the communication request;
determine to attach a note to the communication response; and
determine to record, to a customer relationship management (CRM) server, the communication response and the attached note.

34. The remote apparatus of claim 33, wherein the at least one memory and the computer program code are further configured to, with the at least one processor, cause the apparatus to determine, in response to an operator selection, to send a communication verification message to the server.

35. The remote apparatus of claim 33, wherein an interface and a controller are included in a first device and a telephony interface is included in a second device.

36. A computer program product comprising computer executable program code recorded on a computer readable storage medium, the computer executable program code comprising:
 code for causing selection, at a first user device, of a link in a resource;
 code for causing determination to transmit, from the first user device, a communications request to a server, the communications request based on the link;
 code for causing receipt, at the first user device, from a second user device of identification information of the second user device;
 code for causing determination to transmit, from the first user device to the server, the identification information of the second user device and specification of one or more capabilities of the second user device;
 code for causing receipt, at the first user device, of a call announcement message from the server according to the communication request and the identifying information, the call announcement message responsive to a communication verification message sent by a remote device, wherein the link does not include identification of the remote device; and
 code for causing determination that the first user device will participate in a data conference with the remote device.

37. A computer program product comprising computer executable program code recorded on a computer readable storage medium, the computer executable program code comprising:
 code for causing receipt, at a server, of a communications request from a first user device, the communications request based on a link in a resource selected at the first user device;
 code for causing receipt, at the server from the first user device, of contact information of a second user device;
 code for causing selection, at the server, of a remote device, wherein the selection takes into account a context of the first user device and one or more dynamic properties of the remote device;
 code for causing determination, at the server, of identification information of the remote device;
 code for causing determination to direct, from the server to the identification information of the remote device, the contact information and information regarding the communication request, wherein the link does not include identification of the remote device;
 code for causing receipt, at the server, of a call verification message from the remote device; and
 code for causing determination, in response to the call verification message, to send, from the server, a call announcement message to the first user device according to the communication request and the contact information.

38. A computer program product comprising computer executable program code recorded on a computer readable storage medium, the computer executable program code comprising:
 code for causing receipt, at a remote device from a server, of information regarding a communication request originated by a first user device and identifying information of a second user device, wherein the communication request is based on a link in a resource selected at the first user device, wherein the remote device corresponds to a context of the first user device;
 code for causing determination to display, at the remote device, the identifying information and the information regarding the communication request;
 code for causing determination, in response to an operator selection, to send, from the remote device, a communication verification message to the server;
 code for causing determination, in response to the operator selection, to place, from the remote device, a communication response to a second user device, the communication response in accordance with the contact information and the information regarding the communication request;
 code for causing determination to attach a note to the communication response; and
 code for causing determination to record, to a customer relationship management (CRM) server, the communication response and the attached note.

39. A server, comprising:
 means for receiving, at the server, from a first user device a communications request comprising a specified resource and contact information of a second user device;
 means for selecting, at the server, a remote device, wherein the selection takes into account a context of the first user device and one or more dynamic properties of the remote device
 means for determining, at the server, identification information of the remote device;
 means for determining to direct, from the server, to the identification information of the remote device the communications request, information of the specified resource, and the contact information of the second user device, wherein a selected link does not include identification of the remote device;
 means for receiving, at the server, a communication verification message from the remote device; and
 means for determining, in response to the call verification message, to send, from the server, a communication announcement message to the first user device according to the communication request and the contact information.

* * * * *

UNITED STATES PATENT AND TRADEMARK OFFICE
CERTIFICATE OF CORRECTION

PATENT NO. : 7,660,587 B2
APPLICATION NO. : 11/258131
DATED : February 9, 2010
INVENTOR(S) : Jukka K. Nurminen et al.

It is certified that error appears in the above-identified patent and that said Letters Patent is hereby corrected as shown below:

On the cover page, under item (75) Inventors:

Please delete "Balasz Bakos, Töröbálint (HU)" and insert --Balazs Bakos, Törökbálint (HU)--; and
Please delete "Timo K. Miettinen, Tursula (FI)" and insert --Timo K. Miettinen, Tuusula (FI)--.

Signed and Sealed this

Twenty-seventh Day of April, 2010

David J. Kappos
*Director of the United States Patent and Trademark Office*